US011438369B2

(12) United States Patent
Schwartau

(10) Patent No.: US 11,438,369 B2
(45) Date of Patent: Sep. 6, 2022

(54) INFORMATION SECURITY

(71) Applicant: Winn Schwartau, Old Hickory, TN (US)

(72) Inventor: Winn Schwartau, Old Hickory, TN (US)

(*) Notice: Subject to any disclaimer, the term of this patent is extended or adjusted under 35 U.S.C. 154(b) by 0 days.

(21) Appl. No.: 16/378,865

(22) Filed: Apr. 9, 2019

(65) Prior Publication Data
US 2019/0312906 A1  Oct. 10, 2019

Related U.S. Application Data

(60) Provisional application No. 62/654,956, filed on Apr. 9, 2018.

(51) Int. Cl.
*H04L 9/40* (2022.01)
*G06F 21/57* (2013.01)
*G06F 21/55* (2013.01)

(52) U.S. Cl.
CPC .......... *H04L 63/1441* (2013.01); *G06F 21/55* (2013.01); *G06F 21/577* (2013.01); *H04L 63/14* (2013.01); *H04L 63/1416* (2013.01); *H04L 63/20* (2013.01); *G06F 2221/2137* (2013.01)

(58) Field of Classification Search
None
See application file for complete search history.

(56) References Cited

U.S. PATENT DOCUMENTS

| | | | | |
|---|---|---|---|---|
| 6,115,472 A * | 9/2000 | Shimizu | ................ | H04L 9/0643 380/262 |
| 8,180,835 B1 * | 5/2012 | Lu | ........................ | H04L 63/1458 709/206 |
| 8,756,337 B1 * | 6/2014 | Canion | ............... | H04L 63/0245 709/238 |
| 9,442,881 B1 * | 9/2016 | Narayan | ............. | H04L 67/2866 |
| 9,591,015 B1 * | 3/2017 | Amin | .................. | H04L 63/1433 |
| 9,769,276 B2 * | 9/2017 | Bennett | ............... | H04L 67/2842 |
| 10,785,255 B1 * | 9/2020 | Otvagin | ................ | H04L 63/145 |
| 2004/0003284 A1 * | 1/2004 | Campbell | ............. | H04L 63/145 726/24 |
| 2004/0268149 A1 * | 12/2004 | Aaron | ..................... | H04L 63/08 726/11 |

(Continued)

FOREIGN PATENT DOCUMENTS

EP    3515020 A2 *   7/2019   ............. H04L 51/12

OTHER PUBLICATIONS

European Application No. EP19168275.6, Extended Search Report, dated Jul. 12, 2019, 9 pages.

(Continued)

*Primary Examiner* — Michael Pyzocha
(74) *Attorney, Agent, or Firm* — LaBatt, LLC

(57) ABSTRACT

An information security system that incorporates time, feedback, and/or varying trust in analyzing and responding to attacks. A solution can defer processing of a request for a period of time, which can be sufficient to allow the request to be approved or disproved. The solution can be configured to automatically approve or disprove the request after the period of time if no affirmative response is received. Trust for an entity can be periodically determined and can automatically decay over time. Feedback can be used as part of the approval/disproval process and/or to reevaluate trust.

20 Claims, 14 Drawing Sheets

(56) References Cited

U.S. PATENT DOCUMENTS

| | | | | |
|---|---|---|---|---|
| 2005/0188036 A1* | 8/2005 | Yasuda | ............... | H04L 51/12 709/206 |
| 2006/0224724 A1* | 10/2006 | Marinescu | ......... | H04L 63/1416 709/224 |
| 2007/0245409 A1* | 10/2007 | Harris | ................ | H04L 69/10 726/5 |
| 2008/0196104 A1* | 8/2008 | Tuvell | ................ | H04L 51/12 726/24 |
| 2009/0064293 A1 | 3/2009 | Li et al. | | |
| 2009/0248823 A1* | 10/2009 | Li | ................ | H04L 51/14 709/206 |
| 2010/0064362 A1* | 3/2010 | Materna | ............ | H04L 63/1433 726/15 |
| 2010/0217811 A1* | 8/2010 | Kay | ................ | H04L 51/14 709/206 |
| 2013/0117809 A1* | 5/2013 | McDougal | ......... | H04L 63/1408 726/1 |
| 2015/0150123 A1* | 5/2015 | Be'ery | ............... | H04L 63/1416 726/22 |
| 2017/0324708 A1* | 11/2017 | Register | ............. | H04L 63/0227 |
| 2018/0041470 A1* | 2/2018 | Schultz | ................ | H04L 47/24 |
| 2019/0075028 A1* | 3/2019 | Toilet | ................ | H04L 67/1095 |
| 2019/0108332 A1* | 4/2019 | Glew | ................ | G06F 21/552 |
| 2019/0200055 A1* | 6/2019 | Ebata | ............ | H04N 21/440218 |

OTHER PUBLICATIONS

Schwartau, W. "Time Based Security," 1999 Interpact Press, 194 pages.

Schwartau, W., "Analogue Network Security," downloaded Jul. 12, 2019, 86 pages.

Schwartau, W., "Time-Based Security Explained: Provable Security Models and Formulas for the Practitioner and Vendor," 1998 Elsevier Science Ltd., Computer & Security, vol. 17, No. 8, 22 pages.

* cited by examiner

INFORMATION SECURITY

REFERENCE TO RELATED APPLICATIONS

The current application claims the benefit of U.S. Provisional Application No. 62/654,956, filed on 9 Apr. 2018, which is hereby incorporated by reference.

TECHNICAL FIELD

The disclosure relates generally to information security, and more particularly, to a solution for providing information security that focuses on detection of and reaction to attacks and/or other security relevant events.

BACKGROUND ART

Current information security approaches, such as firewalls, are analogous to fortress mentality security of physical sensitive information. For physical information (e.g., documents), a locked cabinet can be located in a locked room and guarded by an armed guard. Only those with proper authority would be able to penetrate the layers of security. However, in electronic information security, this model is always doomed to fail as bad actors continually go a step ahead of the security solutions to penetrate the security by appearing to be a good actor or otherwise getting around the security measures through weaknesses in the solution. Additionally, non-technical attacks, such as social engineering, can be utilized which never directly attack the security solution. As a result of the limitations of current information security approaches, security vendors often will not guarantee or provide specific operational measurements and specification of their products or their measurable efficacy.

Security approaches often rely on an explicitly or implicitly trusted authority. A trusted authority is provided with complete control over the security of a system. Examples of such trusted authorities include: a user of a mobile device; a user account with administrative privileges; a certificate authority; a user of a social media account; and/or the like. When a trusted authority fails or is compromised, e.g., due to maliciousness, exploitation, carelessness, vulnerability exploited, and/or the like, the entire security solution can fail. As a result, solutions that provide complete and/or absolute unchanging trust in a single entity have an inherent vulnerability.

SUMMARY OF THE INVENTION

Illustrative embodiments described herein can include: a solution for removing, detecting, and/or mitigating phishing attacks performed using email, text, and/or electronic communications; a solution for significantly reducing data exfiltration using email, text, and/or electronic communications; a solution for improving the security performance, efficacy of detection, and reaction systems that employ artificial intelligence, deep learning, machine learning, and similar neural approaches to big data analysis; a solution for eliminating internet spam and/or identifying the original perpetrators; a solution for eliminating internet denial of service attacks and/or identifying the original perpetrators; a solution for measuring the efficacy and/or efficiency performance of any communications detection mechanism; a solution for measuring the efficacy and/or efficiency performance of any communications environment; a solution for mitigating the spread of 'fake news' and similar propaganda on social media and similar information distribution sites; a solution for reducing the risk of root control in software and systems; a fundamental solution of hybridizing digital Boolean logic with time-based analogue functionality, herein called the time-based flip flop; a solution for measuring and adjusting the security of a device or environment, based upon continuously variable values of trust relationships between objects and subjects; a solution for implementing detection in depth in existing networked environments; and/or the like.

An embodiment of a solution described herein can add negative and positive dynamic feedback loops into digital decision making logic, to quantitatively measure specific security postures, including the performance and efficacy of any security detection-based product or environment, and comparisons thereof.

An embodiment of a solution described herein can utilize a negative time concept in time based security analytic processes for security detection platforms, to measurably quantify the security of the processes, which can be particularly useful for spam and phishing applications.

An embodiment of a solution described herein can apply a time based out of band security protocol channel, connected to detection and reaction components (e.g., in code, LAN, WAN, BGP/ISP), to dynamically trace hostile and/or unwanted packets of traffic, and identify the source of said traffic.

An embodiment of a solution described herein can minimize the security risks of a single main root control via adding negative and positive dynamic feedback loops into the identification and verification stages.

In an illustrative solution, in response to receiving an interaction request for a requesting entity, a request receiving component starts a timer for an approval time period, within which approval or disproval for the interaction request must be received or a default action (e.g., approval or disproval) will be taken. Additionally, the request receiving component can send a request for approval or disproval of the interaction request, e.g., to the requesting entity and/or another entity. Furthermore, the request receiving component can forward the interaction request to a request processing component.

The request processing component can commence processing the request prior to the approval time period expiring or can wait to commence processing the interaction request only after the interaction request has been approved. In the former case, the request processing component can delay for a small time period to allow some of the evaluation of the interaction request to complete prior to commencing the processing. When the processing is commenced prior to the interaction request being approved or disproved, the processing can use one or more approaches to slow the processing, such as reducing communications bandwidth, padding requested data with additional data, and/or the like. In response to an interaction request being disproved, the request processing component can halt further processing of the interaction request.

Embodiments can use trust factors corresponding to various entities in order to determine how to process an interaction request. The trust factor can represent how much trust an entity has in the other entity for the particular action. In an embodiment, an entity automatically degrades the trust factor over time, absent receiving some additional information regarding the other entity. Entities in a network can share the trust factors for other entities and can combine the trust factors as part of evaluating an interaction request.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 1A and 1B show graphs illustrating a relationship between exfiltration time and detection and response time according to embodiments, while

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1A:
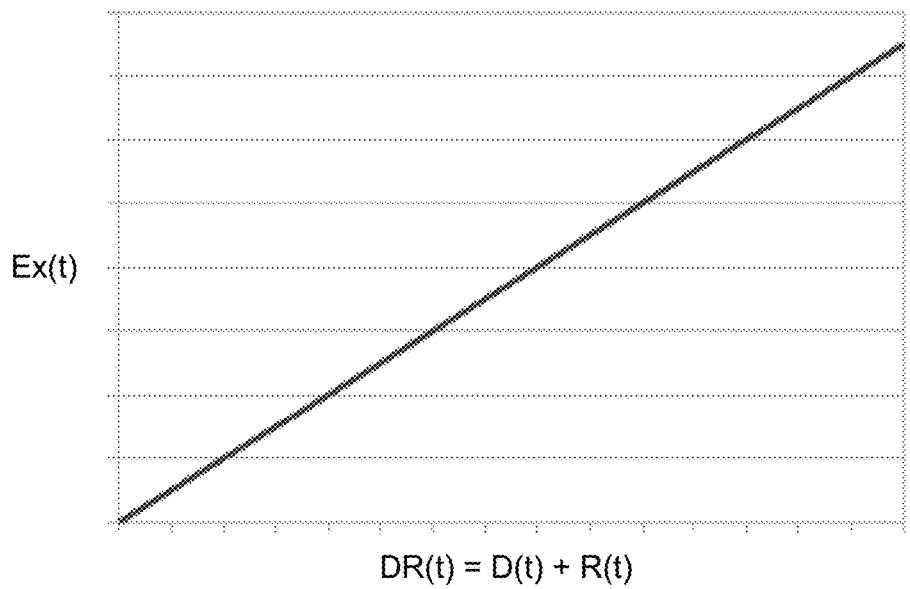

Various features of the invention are shown and described in conjunction with an attack. The attack can comprise any type of attack on an information network. It is understood that "attack," as used herein, is also inclusive of other security relevant events, including user mistakes, and/or the like. To this extent, an "attack" includes any action or event that can result in harm (including a reputational harm) to the user and/or an entity associated with the user (e.g., a business or other type of organization). To this extent, an "attacker" can comprise a user inadvertently acting on behalf of a malicious third party, a user that made a mistake, and/or the like.

The inventor proposes a new approach to providing information security. Embodiments of the solution can include one or more of the following benefits:

Simplicity. Can be conceptually simple and offer utility to developers, vendors, consultants, integrator, the customer, and all vested stakeholders.

Utility. Can have minimal interference in network operations or the ability of administration, management, and users to do their job. Some security models have negatively affected network efficiency and user productivity. The fundamental design can be network protocol and/or programming language agnostic.

Scalable. Can offer security from the smallest network, app(lication) or single control process to the largest of critical infrastructures.

Measurable. Can be configured to measure and quantify the effectiveness of security and support security budget decision making and risk.

Quantifiable. Quantifiable metrics can provide replicable mathematical tools to measure the integrity of solutions to system security problems.

Provable. Can use simple, basic mathematics at its core, which are replicable in disparate environments by non-mathematicians.

Supports Management. Can offer metrics and/or mechanisms to allow management to make informed budgetary decisions on information resources and systems defensive spending and risk.

Brings Risk to the Table. Can provide a solution by which various experts, including security professionals, accountants, financiers, and/or actuarial experts, can talk to each other with some common lingua franca. To date, information security has brought few hard numbers to the analysis and concepts of security.

Adds Value. Can offer something of value over or different from current approaches.

Overview of Considerations

The inventor proposes a time-based approach to information security. An effectiveness of any security solution can be measured by:

P(t): An amount of protection, measured in time;
D(t): An amount of time to detect an intrusion;
R(t): A reaction time after detection; and
E(t): An exposure time for the secured environment As a general rule, it is desired for the security solution to meet the following condition:

$$P(t) > [D(t) + R(t)],$$

which says, "if the measured time afforded to me by a protection device is greater than the amount of time it takes to detect and respond to (e.g., repair, mitigate, reconstitute, halt, and/or the like) an attack, then I have a secure environment." However, in general, P(t) is not knowable. As a result, assuming the worst case scenario of no protection (e.g., P(t)=0) or undefinable protection, the exposure time, E(t), can be calculated as:

$$E(t) = [D(t) + R(t)]$$

As a result, a goal for the security solution can be stated as:

$$[D(t) + R(t)] \to 0.$$

When an amount of protection, P(t), can be determined (e.g., within a range or a limit) with some level of confidence, when P(t)<[D(t)+R(t)], the exposure time can be calculated as:

$$E(t)=\{[D(t)+R(t)]-P(t)\},$$

which means that the exposure time is reduced by the amount of protection.

For any attack, the attacker will require some time in order to complete the attack. In an information technology environment, this may correspond to the time required to extract the desired data from a system. This time can be defined as the exfiltration time, Ex(t). In general, for any information security solution, it is desirable that a detection and response time, DR(t), which can be calculated as D(t)+R(t), be less than the exfiltration time Ex(t). FIG. 1A shows a graph illustrating a relationship between exfiltration time Ex(t) and detection and response time DR(t). The line on the graph corresponds to when the exfiltration time Ex(t) is equal to the detection and response time DR(t). When the exfiltration time Ex(t) is greater than the detection and response time DR(t), e.g., the region to the upper left of the line, an attack can be halted before completely succeeding. Conversely, when the exfiltration time Ex(t) is less than or equal to the detection and response time DR(t), e.g., the region to the lower right of the line, an attack will be successful.

Delayed Action

Figure 1B:
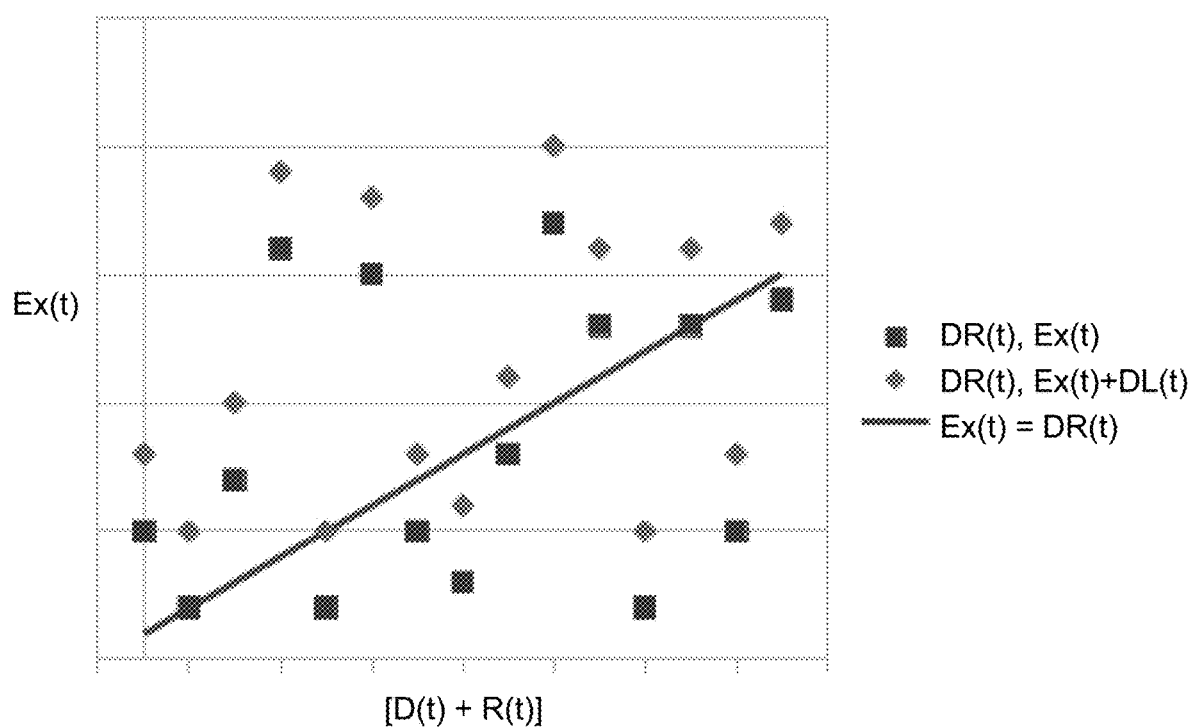

In an embodiment, an information security system can add a delay line time, DL(t), to the action(s) involved in exfiltrating the targeted item(s) (e.g., data from a computer system). The delay line time DL(t) can be implemented using any solution. For example, the delay line time DL(t) can correspond to a delay prior to starting the action(s) involved in the exfiltration, a series of delays (e.g., smaller delays) for each of a series of actions involved in the exfiltration, a slowing of the exfiltration (e.g., via padding the data with additional data), and/or the like. By adding the delay line time DL(t), additional unauthorized exfiltrations can be successfully stopped by a security solution. For example, FIG. 1B shows a graph illustrating plots of several exfiltration times Ex(t) versus detection and response times DR(t). In the graph, the squares correspond to the exfiltration times Ex(t) without a delay line time DL(t), whereas the diamonds correspond to the exfiltration times Ex(t) with an added delay line time DL(t), which results in a higher vertical location for the exfiltration time Ex(t). As illustrated by the examples in which the square and corresponding diamond are on opposite sides of the diagonal line, several additional unauthorized exfiltrations can be halted before completing when the delay line time DL(t) is added.

Figure 1C:
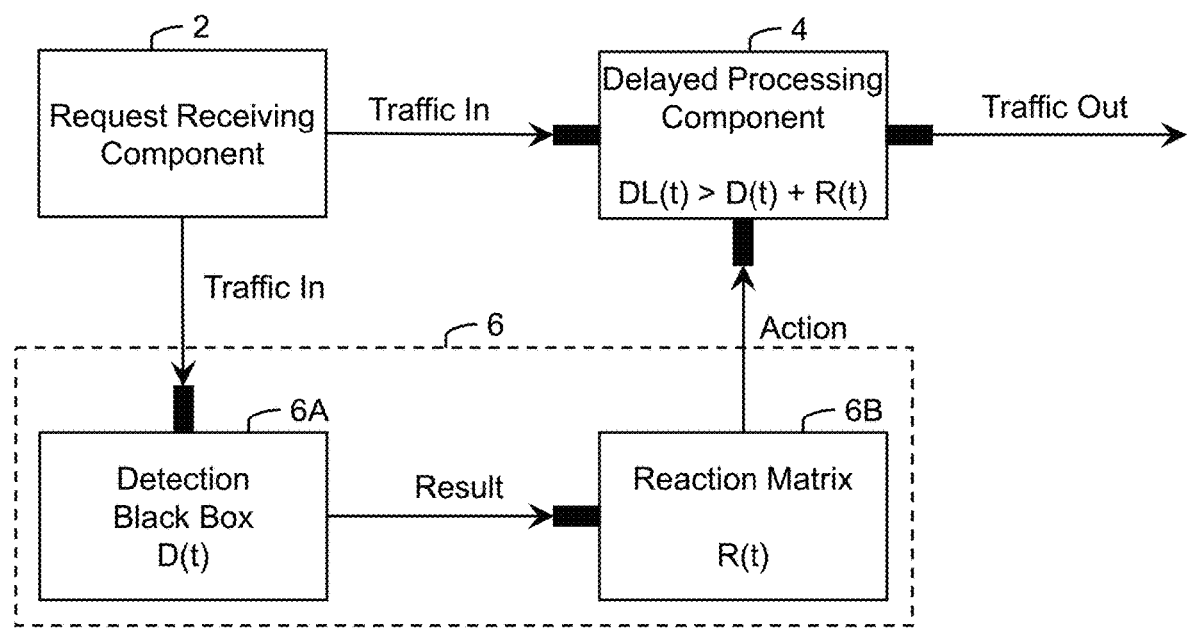
FIG. 1C shows an illustrative block diagram for an information security system according to an embodiment.

In an embodiment, the delay line time DL(t) is set to be larger than the detection and response time DR(t). For example, FIG. 1C shows an illustrative block diagram for an information security system according to an embodiment. As illustrated, when traffic (e.g., an interaction request) is received by a request receiving component 2, it is routed to both a request processing component 4 and an attack protection component 6. The attack protection component 6 can comprise a detection black box 6A, which requires detection time D(t) to evaluate the traffic, e.g., to differentiate 'good' traffic from 'bad' traffic. Once the evaluation is complete, a result can be provided to a reaction matrix component 6B, which requires a reaction time R(t) to block or otherwise remediate the decision. The reaction matrix component 6B can provide an action to the request processing component 4, which can either forward the traffic out as requested, block the traffic, and/or the like. As illustrated, after receiving the request, the request processing component 4 can delay processing the request for a delay line time, DL(t). Since the delay line time DL(t) is larger than D(t)+R(t), the traffic out/decision consequence is not effected until there has been sufficient time for the attack protection component 6 to make an appropriate determination.

Trust Factor

Unlike previous approaches, the inventor proposes to evaluate trust in a non-binary approach. In particular, the inventor proposes a trust factor, TF, where:

$$0<TF<1.$$

In this case, a TF=0 could indicate no trust, while a TF=1 can indicate absolute trust. In this approach, trust, as expressed by the trust factor TF, is a condition that resides between two extreme rarely or never achievable boundary conditions (no trust/absolute trust). Furthermore, trust becomes a variable that can be considered in the detection of and/or reaction to an attack. Regardless, as the trust factor TF is now variable between 0 and 1, the computer system can use a threshold to determine whether a requested interaction is to be approved or not. For example, approval of an interaction may require that the trust factor TF exceed a certain threshold. Depending on an importance of the interaction, the threshold can be set to be higher or lower.

In an embodiment, the trust factor TF for a given entity can be calculated as an average of trust levels (e.g., on a scale of 0 to 1) for each of multiple criteria. In a more particular embodiment, the trust factor TF is calculated using a weighted average of the trust levels for the criteria, which can capture the relative importance of each of the criteria. In an embodiment, the weight (e.g., relative importance) assigned for each criterion can vary based on a type of interaction requested for the entity. While primarily described in terms of trust and a corresponding trust factor, it is understood that embodiments can equally apply the corollary, risk and a corresponding risk factor. To this extent, on a 0 to 1 scale, a trust factor of 0.8 implies a risk factor of 0.2 (e.g., 80% chance of success 20% chance of failure).

When using multiple criteria and/or weights for multiple criteria, it can be important that an organization or group use a consistent set of criteria and corresponding weights for a particular interaction and/or type of interaction. Absent such consistency, different trust factors TF can be calculated by different entities within the organization or group. Such a situation can create a scenario in which whether a requested interaction is trusted or not is dependent on which entity within the organization or group is asked.

In an embodiment, trust (and the corresponding trust factor) changes over time. For example, without additional information, the trust factor can automatically degrade over time. In general, such degradation can be linear, exponential, logarithmic, and/or the like. However, the rate and/or depth of the degradation can be adjusted based on numerous factors relating to risk. When additional information is obtained, the additional information can be used to adjust the trust. In an embodiment, the trust factor TF can be instantly adjusted upward or downward in response to acquiring additional detection data. Additional information also can be used to adjust how trust degrades over time. For example, as more detection data is acquired, the severity of the rate and/or depth of the degradation can be modified up or down accordingly.

An embodiment can delay requested actions (including reactions) for a period of time to allow for evaluation of the action to occur. For example, such delay can provide time for an automated analysis to be performed on the requested action to determine whether the action is suspect. Additionally, the delay can provide time for the requester and/or a third party (e.g., an attack protection component) to evaluate and approve or disprove the requested action. Such approval or disproval can be conducted in-band or out-of-band from the requested action. Depending on the type of action requested, the action can be automatically approved or disproved after the delay period.

An embodiment can dynamically update security using feedback and one or more observe, orient, decide, act (OODA) loops to realize constantly refreshed confidence of the security of a process. In general, it is desired that each component of the OODA loop be implemented faster than an OODA loop implemented by an attacker. By periodically revisiting, reviewing, and modifying an OODA loop based on feedback from a changing environment (e.g., changing threats, networks, personnel, code, relationships, and/or the like), the OODA loop can be adjusted, when necessary, to be effective against the known attackers (e.g., execute faster than the OODA loop of the known attackers).

Theoretical Basis

Following is a theoretical basis as currently understood by the inventor for proving the efficacy and security of data by using an analog network security (ANS) solution described herein.

For use in security analysis, Bayes Theorem can be formulated using the following probabilities for two relevant events:

P(D)=the probability that we detected a real attack of some kind;
P(A)=the probability that an attack of this kind is in progress; and
P($\overline{A}$)=the probability that an attack of this kind is not in progress, which is equal to 1−P(A).

To evaluate P(D) and a corresponding effectiveness of a detection system, the probabilities of both true positive and false positive detections should be considered. To this extent, we can use the following equation:

$$P(D)=(P(D|A) \times P(A))+(P(D|\overline{A}) \times P(\overline{A})),$$

where P(D|A) is the probability that we detected a real attack and P(D|$\overline{A}$) is the probability that we detected an attack when such an attack was not occurring (a false positive detection), which is equal to 1−(P(D|A). Applying Bayes, the probability of an attack given a detection, P(A|D) can be calculated as:

$$P(A|D)=(P(D|A) \times P(A))/P(D)$$

Using an illustrative example, for P(D|A)=0.99; P(A)= 0.001, we can calculate P(D)=0.011 and P(A|D)=0.09. To this extent, for a given attack that has a 1/1000 probability of occurring and which is detected with 99% accuracy, the probability that an actual attack is detected for a given detection, P(A|D) is only approximately 9%. However, extending the model to consider time, suppose the given attack is again detected on the network some time later. In this case, P(A) is now 0.09 instead of 0.001. Applying this new value to the formulas above, P(A|D) is now approximately 91%. To this extent, the second detection event significantly increases the confidence that an actual attack has been detected. By calculating the probabilities that something is a 'real threat' (such as DoS-like events) and passing this knowledge to other nodes, the other nodes can make better predictions regarding the same/similar threats using a basic Bayesian model, outlined above.

Similarly, a probability of a true positive for detecting an attack, P(TP), can be compared with a probability of a false positive for detecting the attack, P(FP). The respective probabilities can be calculated as:

P(TP)=TP/FP, where TP is a true positive region of a Gaussian distribution for attacks and FP is a false positive region of a Gaussian distribution for non-attacks; and
P(FP)=TN/FN, where TN is a true negative region of the Gaussian distribution for non-attacks and FN is a false negative region of the Gaussian distribution for attacks.

In an embodiment, P(TP) is increased and/or P(FP) is decreased by applying feedback acquired over time. For example, multiple local detection systems can contribute feedback to a global detection system, which can result in improved metrics for all of the detection systems.

In an embodiment, an information security system (e.g., an attack protection component of a system) uses a trust factor, TF, to determine whether a requested interaction is approved or disproved. As discussed herein, the trust factor TF can represent a level of trust associated with an entity, A, which can be anything, such as a person, a system, a device, a server, etc. The trust factor of A, TF(A), without additional information, can automatically decay over time. For example, to determine a trust factor of A for a time t+1, an embodiment can use a formula expressed as:

$$TF_{t+1}(A)=TF_t(A)+\delta(t,t+1)+I(TF_t(A),x_1, x_2, \ldots, x_n),$$

where $TF_t(A)$ is the trust factor value of A at time t, $\delta(t, t+1)$ is a delta function for the decay in trust over time, and $I(TF_t(A), x_1, x_2, \ldots, x_n)$ is an influencing function, which can alter the decay based on one or more parameters $x_1$, $x_2, \ldots, x_n$.

The delta function can be expressed in any of numerous ways. For example, the delta function can implement a linear rate of change, r, such that $\delta(t, t+1)=rTF_t(A)$. Alternatively, the delta function can implement an exponential decay, such that $\delta(t, t+1)=e^{-(t/S)}-e^{-(t+1/S)}$, where S tempers the exponential decay in terms of e. Furthermore, the delta function can implement an logarithmic decay, such that $\delta(t, t+1)=s \cdot \log_e(1-t)^8$, where s is a scaling factor for the logarithmic decay. However, it is understood that these examples are only illustrative of numerous possible solutions for calculating a decay using the delta function.

As discussed herein, the influencing function can alter the decay caused by the delta function. In an embodiment, the influencing function can trigger an automatic reassessment of the trust factor in response to one or more events. For example, when the trust factor crosses a threshold or is within a certain bound, the influencing function can cause the information security system to reassess the trust factor. Such a solution can ensure that the trust factor is automatically reassessed periodically. In an embodiment, another triggering event, such as a request from a user, can cause the trust factor to be reassessed.

The influencing function can process one or more of the parameters $x_1, x_2, \ldots, x_n$ to adjust the trust factor for A. The parameters can include, for example: D(t), an amount of time to detect an intrusion; R(t), a reaction time after detection of an intrusion; a detection and reaction time DR(t); one or more delay line time(s) DL(t); a number of successful two-party checks performed by A; a number of times A has made a false positive claim; trust factor(s) for A for one or more other nodes; etc. It is understood that this list of parameters is only illustrative and various parameters can be used. Regardless, it is understood that for each time increment, none or only some of the parameters can be processed. For example, when a corresponding parameter does not have any changed/new information during the time increment, the influencing function can ignore the parameter. To this extent, the influencing function may not have any impact on the trust factor for A during one or more time increments.

Adjustments to the trust factor caused by the influencing function can increase or decrease the trust factor for A. It is understood that any changes to the trust factor for A caused by the delta function and/or the influencing function must be bounded so that the resulting trust factor for A remains a value within an acceptable range of values, e.g., $0 \leq TF(a) < 1$.

Figure 2A:
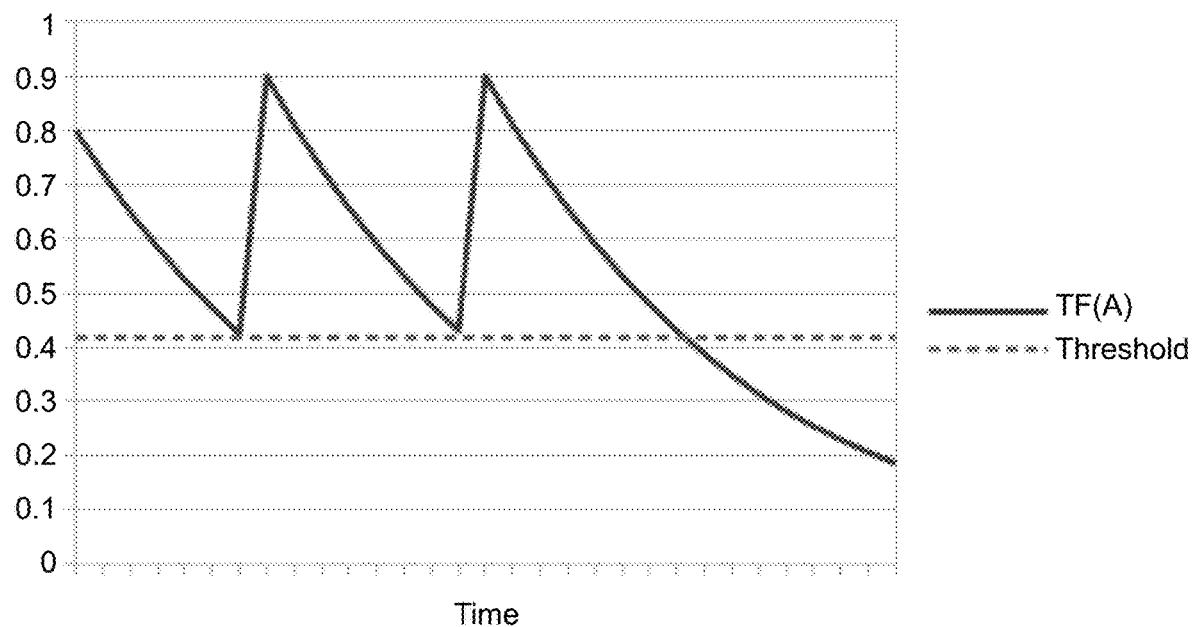
FIGS. 2A and 2B show illustrative graphs illustrating adjustments to a trust factor over time according to embodiments.
Figure 2B:
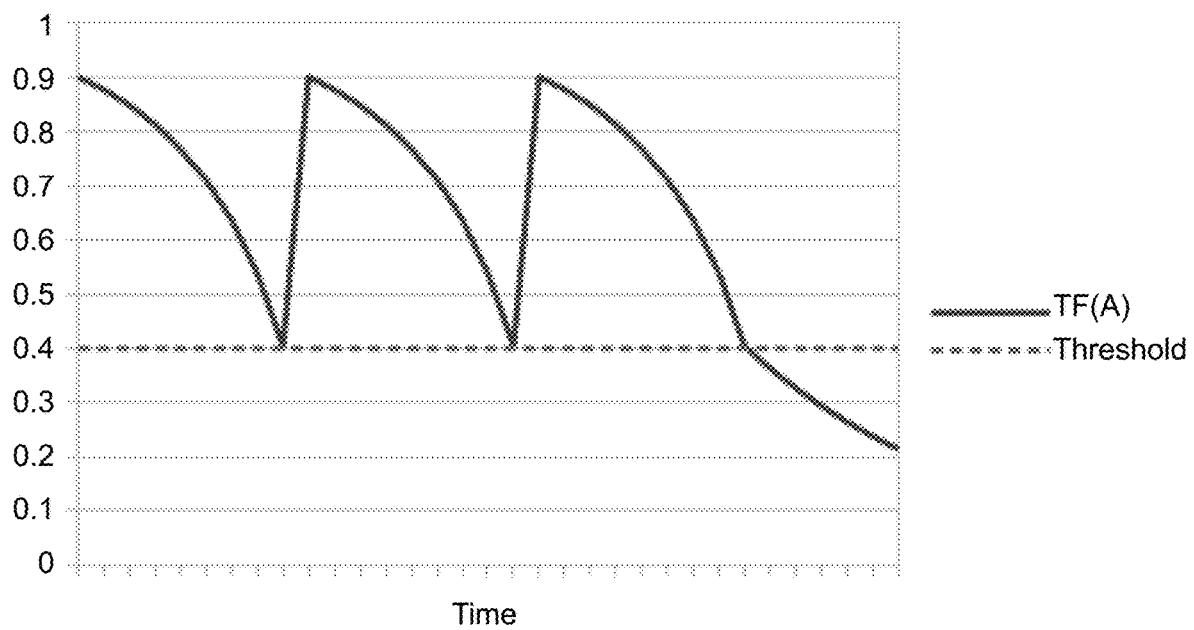

FIGS. 2A and 2B show illustrative graphs of a trust factor for A, TF(A), over time according to embodiments. In FIG. 2A, the trust factor starts at 0.8 and decays automatically using an exponential decay function. In FIG. 2B, the trust factor starts at 0.9 and decays using an logarithmic decay function. In each case, once the trust factor TF(A) decays to a threshold (e.g., approximately 0.4), an influencing function can automatically reassess the trust factor TF(A). In both illustrations, for the first two invocations of the influencing function, the trust factor TF(A) is increased to 0.9, before automatically decaying again. In the third invocation of the influencing function, something has changed with respect to the actor A, and therefore the trust factor TF(A) is allowed to continue to decay.

In the logarithmic delay shown in FIG. 2B, the decay function below the threshold is changed to an exponential decay function to prevent the trust factor TF(A) from quickly collapsing to 0. However, it is understood that this is only illustrative. In an embodiment, a system can include only a single threshold. In this case, the trust factor TF(A) can be allowed to continue to decay until a request to invoke the influencing function is received. However, it is understood that this is only illustrative and the influencing function can again be automatically invoked, e.g., in response to a second or subsequent threshold being crossed, an amount of time elapsing, etc.

In an embodiment, two or more related trust factors can be combined, e.g., within a network. For example, a node can calculate an initial trust factor for a new node using a combination of a trust factor the new node has for a third node and the trust factor the node has for the new node. Similarly, a node can calculate an initial trust factor for a new node using a combination of the trust factors other known nodes have for the new node, which can be weighted by the trust factor that the node has for each of the other known nodes. A number of trust factors, n, can be combined using any solution, such as by calculating a mean of the n values. In a more particular embodiment, the n trust factors can be combined using a geometric mean. In this case, the n trust factors are multiplied together and the n-th root of the multiplied values is calculated as the geometric mean. The geometric mean can provide significantly increased sensitivity to changes in a single trust factor and/or significant differences in the levels of trust as compared to an arithmetic mean. To this extent, even a single low trust factor in a system can result in significantly decreased trust (and the resulting security) in the system.

In an embodiment, weights, $\sigma_1, \sigma_2, \ldots, \sigma_s$, can be assigned to n inputs and intersections of nodes in a network, e.g., an OOB network. For example, the weights can be calculated as the geometric mean of the corresponding weighted trusts. Additionally, Bayesian intersections for true/false positives and negatives can be applied. From these calculations, an overall trust factor for a network (or a relevant portion of a larger network) can be determined.

Figure 3:
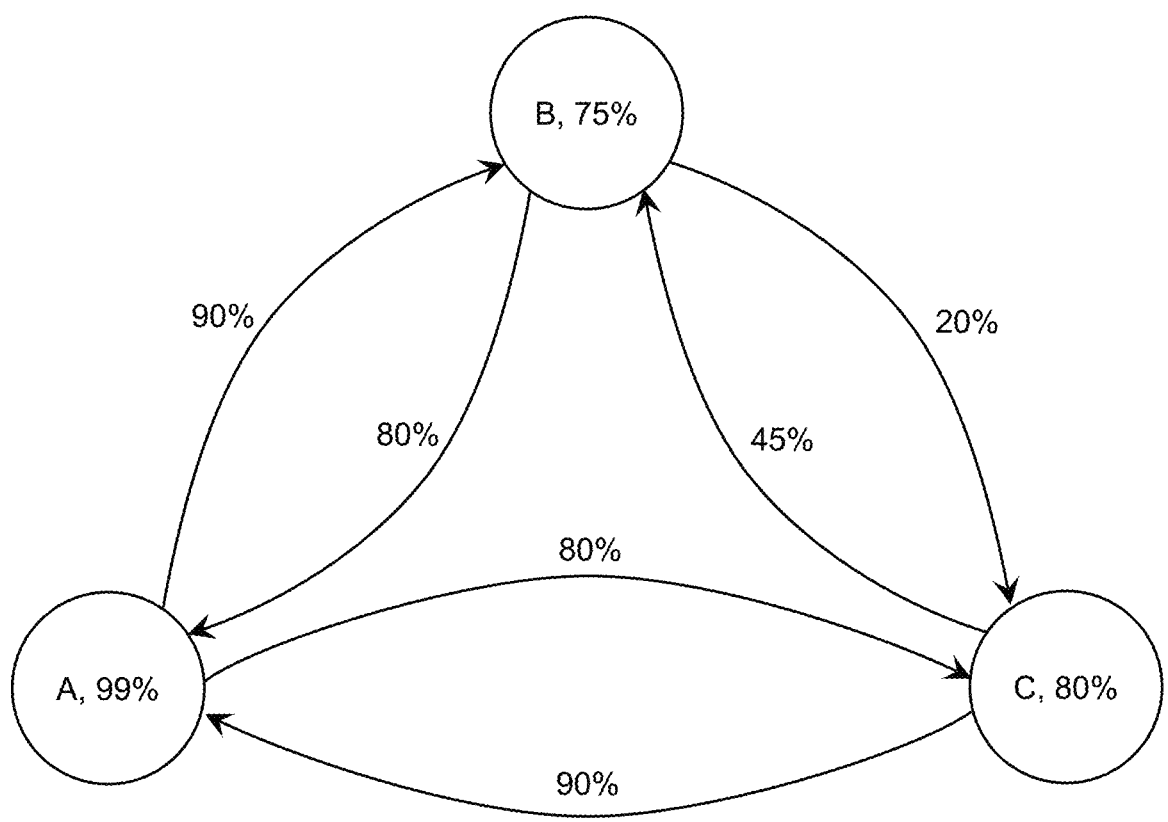
FIG. 3 shows a graph of an illustrative system including three nodes and their corresponding trust factors for identifying a given event and the weighted trusts between the nodes, according to an embodiment.

FIG. 3 shows a graph of an illustrative system (e.g., network) including three nodes, A, B, C, and their corresponding trust factors for identifying a given event (e.g., an attack) and the weighted trusts between the nodes, according to an embodiment. As illustrated, node A has a trust factor of 0.99, node B has a trust factor of 0.75, and node C has a trust factor of 0.8. Additionally, node A has a weighted trust for node B of 0.8 and a weighted trust for node C of 0.9; node B has weighted trusts of 0.9 and 0.45 for nodes A and C, respectively; and node C has weighted trusts of 0.8 and 0.2 for nodes A and B, respectively. An aggregation of the input probabilities can comprise:

$P(A \cup B \cup C)$, which when expanded, equals:

$$\sigma_1 P(A) + \sigma_2 P(B) + \sigma_3 P(C) - \sigma_4 P(A \cap B) - \sigma_5 P(A \cap C) - \sigma_6 P(B \cap C) + \sigma_7 P(A \cap B \cap C),$$

where $\sigma_1, \sigma_2, \sigma_3$ can comprise the geometric mean of the weighted trusts of the other nodes for the corresponding node, $\sigma_4, \sigma_5, \sigma_6$ can comprise the geometric mean of the weighted trusts between the respective nodes, and $\sigma_7$ can comprise the geometric mean of all of the weighted trusts in the network. Using the values shown in FIG. 3, $P(A \cup B \cup C)$ is approximately 52.6%, which is the dependent trust and confidence of the network.

This value can be used in evaluating the probability of an attack given a detection $P(A|D)$, which can be calculated as $(P(D|A) \times P(A))/P(D)$. In particular, using $P(D|A) = 0.526$ and a $P(A) = 0.001$ and the formulas described herein, the probability of an attack given a detection $P(A|D)$ is approximately 0.00111, or 0.11%. While this confidence is small, this is only for the first detection. Iteratively substituting a new percentage in further recalculations for additional detections gives: approximately 0.19% after 5 additional detections; approximately 0.53% after 15 additional detections; approximately 11.77% after 45 additional detections; and approximately 84.98% after 80 additional detections.

To this extent, in a network in which a response can be automatically triggered when the confidence exceeds 80%, an automatic reaction can occur within 80 detections. By taking into account data from numerous nodes, such an automated reaction can occur despite the event being quite rare (e.g., 0.1% occurrence rate) and the confidence of the network (52.6%) being quite low. To this extent, for a network with a confidence of 90%, an automated reaction triggered by an 80% confidence can occur within 4 detections. For a network with a confidence of 92%, the automated reaction triggered by an 80% confidence can occur within 3 detections. With this approach, a confidence some event is an attack rises with the incidence of the attack, which provides a solid justification as to why some event is considered an attack.

In addition to providing an information security solution, embodiments of the invention can be directed to evaluating an effectiveness of other information security solutions. For example, embodiments can provide a system and/or method for evaluating different information security solutions and rating an effectiveness of each at detecting and/or responding to one or more of various types of attacks. Such an evaluation can be integrated into a solution described herein, e.g., as part of a determination of a trust factor for the output from one of the information security solutions.

System Design

Figure 4:
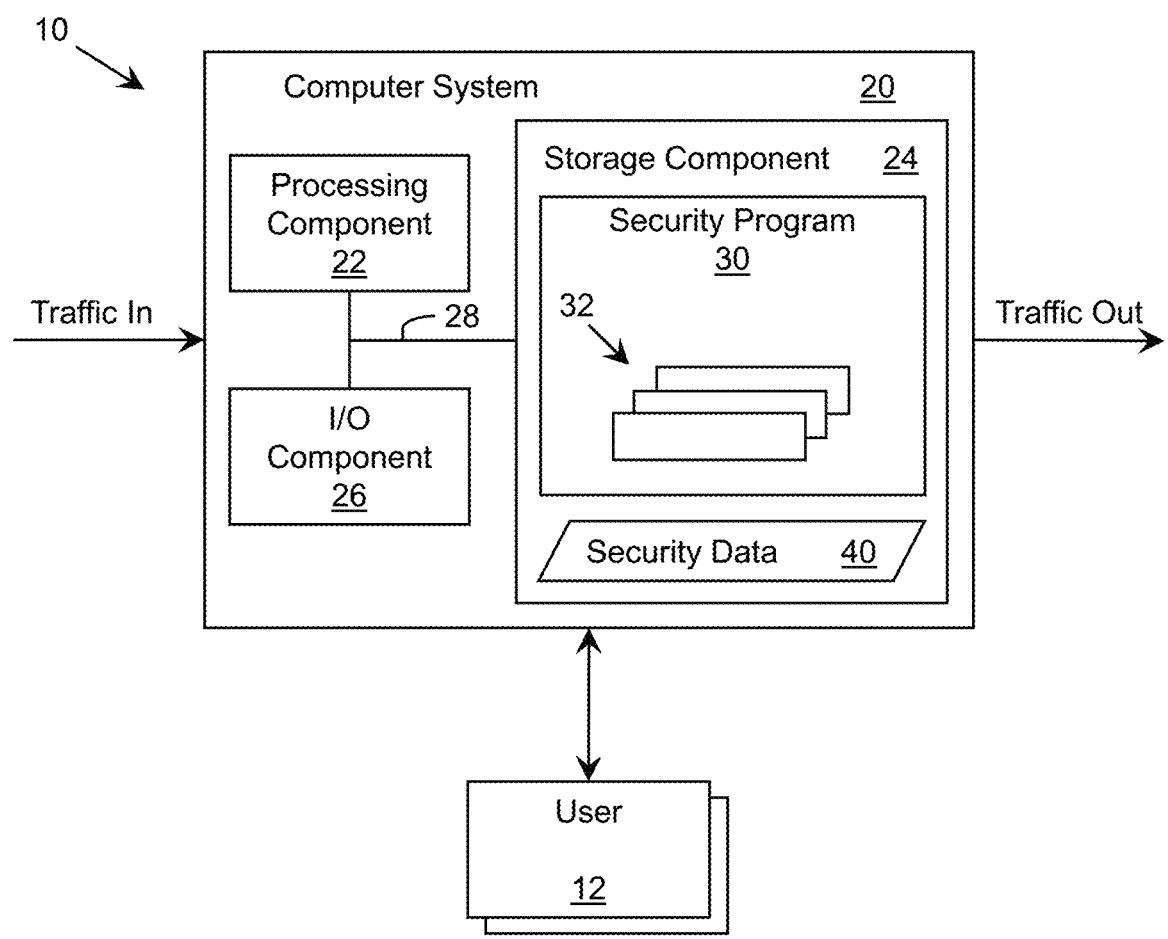
FIG. 4 shows an illustrative environment for implementing information security according to an embodiment.

FIG. 4 shows an illustrative environment 10 for implementing information security according to an embodiment. To this extent, the environment 10 includes a computer system 20 that can perform a process described herein in order to provide information security for an entity (e.g., an organization, an individual, a larger computer system, etc.). In particular, the computer system 20 is shown including a security program 30, which makes the computer system 20 operable to provide information security for the entity by performing a process described herein.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the security program 30, which is at least partially fixed in storage component 24. While executing program code, the processing component 22 can process data, which can result in reading and/or writing transformed data from/to the storage component 24 and/or the I/O component 26 for further processing. The pathway 28 provides a communications link between each of the components in the computer system 20. The I/O component 26 can comprise one or more human I/O devices, which enable a human user 12 to interact with the computer system 20 and/or one or more communications devices to enable a system user 12 to communicate with the computer system 20 using any type of communications link. To this extent, the security program 30 can manage a set of interfaces (e.g., graphical user interface(s), application program interface, and/or the like) that enable human and/or system users 12 to interact with the security program 30. Furthermore, the security program 30 can manage (e.g., store, retrieve, create, manipulate, organize, present, etc.) the data, such as security data 40, using any solution.

In any event, the computer system 20 can comprise one or more general purpose computing articles of manufacture (e.g., computing devices) capable of executing program code, such as the security program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the security program 30 can be embodied as any combination of system software and/or application software.

Furthermore, the security program 30 can be implemented using a set of modules 32. In this case, a module 32 can enable the computer system 20 to perform a set of tasks used by the security program 30, and can be separately developed and/or implemented apart from other portions of the security program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 20.

When the computer system 20 comprises multiple computing devices, each computing device can have only a portion of the security program 30 fixed thereon (e.g., one or more modules 32). However, it is understood that the computer system 20 and the security program 30 are only representative of various possible equivalent computer systems that may perform a process described herein. To this extent, in other embodiments, the functionality provided by the computer system 20 and the security program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 20 includes multiple computing devices, the computing devices can communicate over any type of communications link. Furthermore, while performing a process described herein, the computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, the security program 30 enables the computer system 20 to provide security in an information technology system (e.g., a network). To this extent, the computer system is configured to receive traffic ("Traffic In") and send traffic ("Traffic Out"), e.g., over a network. The security program 30 enables the computer system 20 to evaluate the traffic that is received and make a determination as to whether the traffic is authorized or hostile (e.g., an attack). In response to determining that the traffic is hostile, the security program 30 can enable the computer system 20 to perform one or more actions to react to the attack.

In an illustrative implementation, the computer system 20 can be configured to function as a firewall for an information network. In another illustrative embodiment, the computer system 20 can be configured as an electronic mail server or agent, such as a simple mail transfer protocol (SMTP) electronic mail server or agent. However, it is understood that these are only illustrative of various implementations as described herein.

Attack Detection and Reaction

Unlike previous approaches, the inventor proposes to reduce the detection time and reaction time, rather than solely rely on purportedly increasing the protection time. By reducing the detection and reaction times, a solution for providing information security becomes easier to implement. For example, the solution does not require huge levels of protection. Rather, the solution can concentrate on detection and reaction, which ultimately determines the amount of effective security provided by the solution.

As discussed herein, feedback can be used in both the detection of an attack and reaction to an attack. Such feedback can be used to improve the accuracy of and/or time required for future detections and/or reactions. In particular, in a network, the feedback can reduce risk by confining upper and lower limits of trust to acceptable and manageable levels.

Time Limited Approval

One embodiment of the invention uses feedback and multiple required authorizations in order to implement a default reaction time to an event. This feedback can be implemented using a time-based flip-flop approach. In general, this approach requires authorization by a single entity (e.g., a first user 12) and verification of the authorization by a second entity (e.g., a second user 12) within a predetermined amount of time. Embodiments also can require a single entity to provide both the authorization and the verification of the authorization. Additionally, embodiments can require verification by two or more different entities, any combination of one or more of multiple possible entities, and/or the like. Using the approach described herein and suitable values for the amount of time, the overall risk can be provably reduced significantly.

Figure 5:
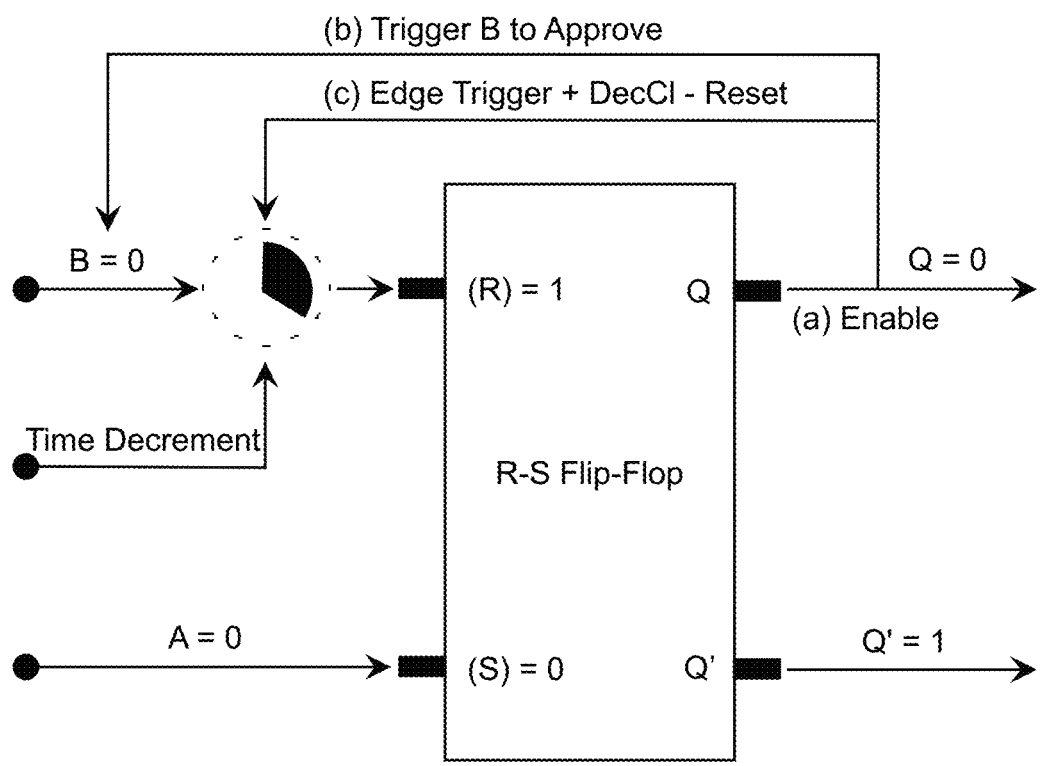
FIG. 5 shows an illustrative time-based flip-flop according to an embodiment.

FIG. 5 shows an illustrative time-based flip-flop according to an embodiment. In this case, the time-based flip-flop comprises an R-S flip-flop, also known as a latch. The R-S flip flop comprises two inputs, a set (S) input and a reset (R) input, and two outputs, Q and Q' (the opposite of Q). During operation, when the set (S) input is high (1), the output Q goes high (1) and the output Q' goes low (0). When the reset (R) input goes high, then the output Q goes low (0) and the output Q' goes high (1). When both the reset (R) and set (S) inputs are low, the R-S flip-flop maintains the current outputs. If both the reset (R) and set (S) inputs are high, both outputs Q and Q' are low, which breaks the general rule that Q and Q' are opposite. As a result, a condition in which both inputs are high can be forbidden. However, depending on the use or non-use of Q' in a particular implementation, this condition can be allowed.

The time-based flip-flop adds a timer (decrementing clock) to the reset (R) input circuit. The timer can be edge triggered and start counting down from a predetermined time value (time decrement) in response to an input corresponding to the output Q transitioning from low to high (e.g., 0 to 1). In response to the same input transitioning from high to low, the timer can reset to the predetermined time value and stop counting down, while keeping the timer output low. Similarly, in response to the clock input from entity B transitioning from low to high, the timer can reset to the predetermined time value and stop counting down, while keeping the timer output low. When the input from entity B does not transition from low to high within the predetermined time, the timer will fully count down and, in response, the output of the timer will transition the reset (R) input from low to high and the timer can reset to the predetermined time value.

It is understood that the predetermined time value can be selected to ensure that entity B has sufficient time to receive the request (which is analogous to the detection time D(t) discussed herein) and react to the request (which is analogous to the reaction time R(t) discussed herein). To this extent, the predetermined time is analogous to the exposure time, E(t), described herein. Such an amount of time can vary significantly based on the particular communication solution being utilized, whether the entity is a machine or human, etc.

In operation, entity A can comprise a requester. Entity A submits a request by setting the set (S) input to high. Entity B can comprise an approver for the request. In an embodiment, entity B can correspond to the attack protection component 6 shown in FIG. 1C. Entity B is provided a certain amount of time (e.g., the predetermined time) to receive the request and approve, which is controlled by the timer. After entity A makes a request, the output Q goes high, which results in: (a) enabling an action performed by a subsequent circuit (e.g., a request processing component 4, shown in FIG. 1C) connected to the output Q; (b) entity B is notified, through some communications solution, that an approval is requested; and (c) the rising edge of the output Q (transitioning from 0 to 1) can trigger the timer, which can count down from a predetermined time value. Should entity B approve the request prior to the timer reaching zero, the timer will stop and the output Q will remain high. Should entity B not approve the request before the timer reaches zero, the timer output will transition the reset (R) input to high, resulting in the output Q going low, thereby revoking the action (e.g., permission) requested by entity A. In an embodiment, entity B can have a trust factor that is the same as or higher than the trust factor for entity A. To this extent, any entity required to approve a primary decision can have an equal or greater level of trust than the original decision maker.

While operation of the time-based flip-flop has been described in conjunction with a first entity requesting an action, which requires approval by a second entity within a predetermined amount of time, it is understood that this is only illustrative of various applications for a time-based flip-flop. For example, in embodiments, entity B is the same as entity A. In this case, a requester can be provided an opportunity to revoke a requested action within the predetermined time. Additionally, the time-based flip-flop can be implemented to prevent an action from taking place until both entities A and B are in agreement that the action should take place within the predetermined time. Still further, while a single requester and a single approver are shown, it is understood that a time-based flip-flop can be implemented with any number of possible requesters and/or possible approvers.

Use of the time-based approval and revocation model described herein provides a limit on the exposure time during which a system is susceptible to attack, which is commonly not limited in information security and similar applications. The model can bring measurable degrees of stability and equilibrium to code, networks, security, etc. By using this approach, the dangers of root control, or single-process decision making without any oversight, can be hugely reduced. For example, by requiring an entity B with a trust factor of 0.9 to approve a request of an entity A with a trust factor of 0.9, an overall risk can be reduced by 90% (e.g., risk drops from 10% to 1%). Even for entities with lower trust factors the overall risk can be significantly reduced. For example, when entity A has a trust factor of 0.7 and entity B has a trust factor of 0.8, the overall risk of performing an action requested by entity A drops from 0.3 without approval required to 0.06 when the action is approved by entity B.

As noted, in the time-based flip-flop shown in FIG. 5, the action requested by entity A is initially enabled and remains enabled for a time period that corresponds to the predetermined time for the timer within which entity B must approve. As the action is enabled for at least some period of time, the corresponding risk is increased. Considering a trust factor for entity A and entity B, a risk can be quantified for this time period. For example, a maximum approval time, MA(t), can be selected for the requested action. The maximum approval time can be selected using any solution. For example, the maximum approval time can be selected based on a risk tolerance, available resources, policy, etc. In an embodiment, the maximum approval time can correspond to an extraction time, as any approval received after such a time is useless, or a percentage of the extraction time (e.g., fifty percent or less).

The predetermined time for the timer must be set to be less than the maximum approval time MA(t). For entities A and B with trust factors of 0.9 and a maximum approval time MA(t) of 1000 units (e.g., seconds, clock cycles, etc.), different predetermined times for the timer will affect the amount of risk incurred due to the action being initially approved. In particular, the trust factor for the combined entity A and entity B is 0.99, resulting in a risk of 0.01, without considering time. For a predetermined time for the timer of 1 unit or 1/1000th of the maximum approval time MA(t), the amount of risk is only slightly increased, resulting in a cumulative time-based trust factor that is slightly reduced. However, as the predetermined time approaches the approval time MA(t), the amount of risk increases. When the predetermined time is equal to the maximum approval time MA(t), the required approval by the entity B does not result in any improvement in the trust factor.

Figure 6:
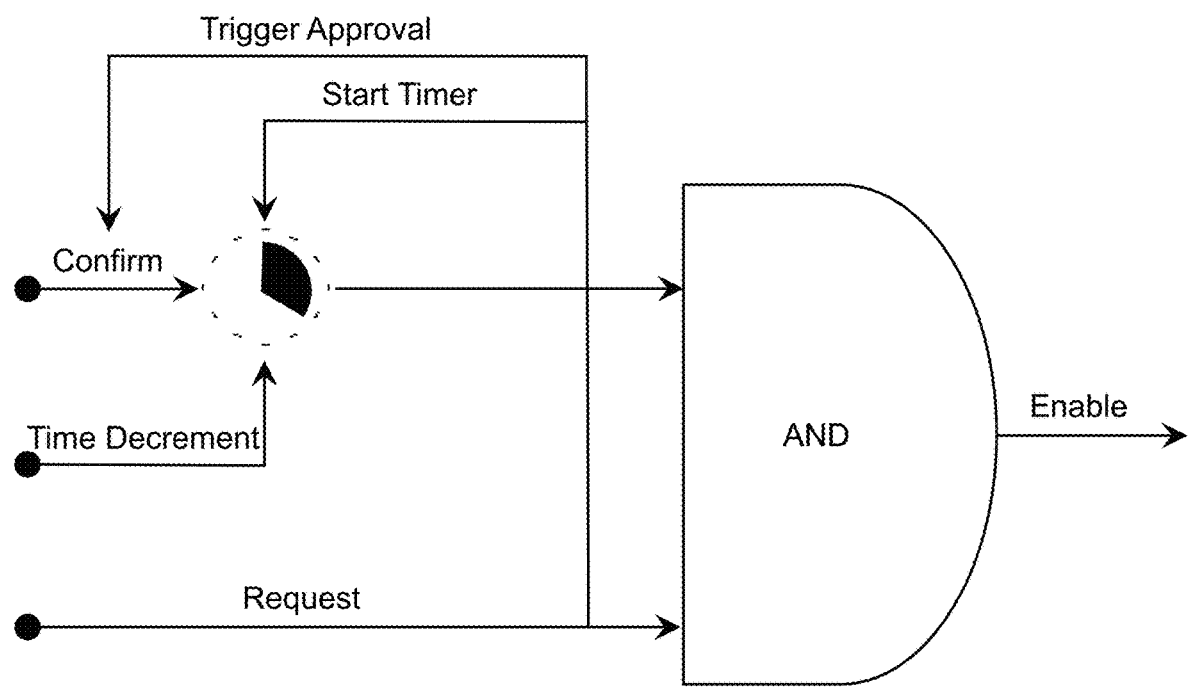
FIG. 6 shows another illustrative implementation of time-based feedback according to an embodiment.

FIG. 6 shows another illustrative implementation of time-based feedback according to an embodiment. In this case, approval of a request is required within a certain amount of time prior to the action being enabled. In particular, a request can result in a first input of an AND gate going high and trigger both a timer to start counting down from a predetermined time as well as an approval request to be sent. In this case, the timer output can be low while it is counting down and the timer can keep the output low in the event that the timer reaches zero. However, upon receiving a confirmation while counting down, the timer can stop counting down and transition the output to high, which results in the request being approved and the corresponding action being enabled by the output of the AND gate going high.

While operation of the time-based flip-flop shown in FIG. 5 and the time-based feedback shown in FIG. 6 have been described in terms of high and low signals and triggers, it is understood that this is only to illustrate any of numerous solutions in which the functionality described in conjunction with the respective circuits can be implemented. To this extent, a time-based flip-flop and a time-based feedback circuit can be implemented in which the sending and/or receipt of data messages corresponds to the corresponding triggers. Embodiments of a time-based flip-flop and a time-based feedback circuit can be implemented using a custom circuit and/or programmatically, and executed by a generic circuit. Still further, it is understood that a time-based flip-flop and a time-based feedback circuit can be implemented at any level of a computing hierarchy, including the hardware level of a computing device, communications software for a computing device, and/or between two or more computers connected on a network.

Attack Detection and Response

To mitigate the effect of an attack that lasts for the exposure time, E(t), the computer system 20 (FIG. 3) can utilize one or more risk limiting solutions. For example, assuming an attacker's goal is to extricate important data from a secure network, a risk limiting solution can limit an amount of important data that can be transmitted out of a secure network (e.g., through the computer system 20) over a given amount of time. For example, an information network can pad the important data with additional data, thereby requiring more data to be transmitted out of the network, and limiting the amount of important data that can be transmitted in a given time (assuming a constant bandwidth). Similarly, an information network (e.g., the computer system 20) can limit the bandwidth for transmissions, e.g., to a suspicious receiving party and/or for an entire network, which then provides additional time for the detection and reaction to be completed (or the suspicious party to be cleared) by the computer system 20. Still further, a risk limiting solution can delay an action (e.g., transmission of traffic out of the computer system 20) for a period of time that exceeds the combined detection and reaction times of the computer system 20.

Figure 7:
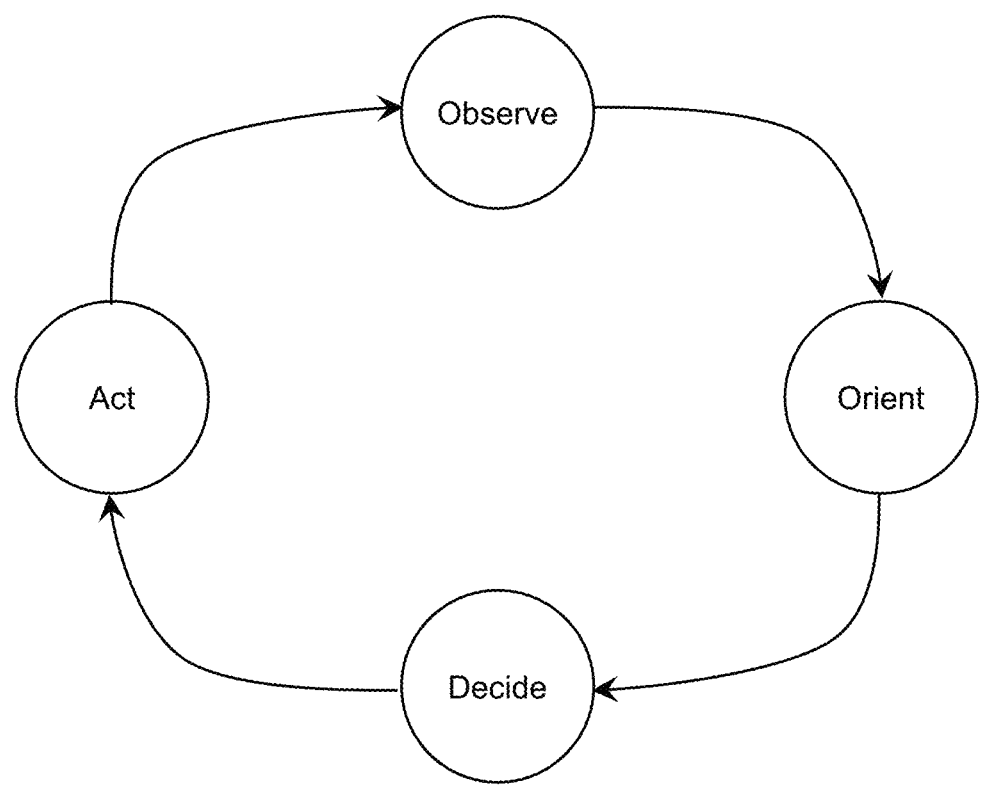
FIG. 7 shows an OODA decision cycle.

The computer system 20 can use feedback to detect and/or respond to an attack. In an embodiment, the security program 30 enables the computer system 20 to implement information security using an observe, orient, decide, act (OODA) decision cycle with feedback. In a further embodiment, the OODA decision cycle can use out of band (OOB) information (e.g., information received and/or transmitted using a different communications solution than that being monitored for the attack). FIG. 7 shows an OODA decision cycle. During the observe state, the computer system 20 can acquire and store data regarding the environment 10. Such data can include data regarding the traffic, data regarding entities communicating in the environment 10, and/or the like. Additionally, such data can be received from another attack protection component, e.g., via an OOB communications solution.

In the orient state, the computer system 20 can analyze the data to form a perspective, e.g., situational awareness. In the decide state, the computer system 20 can create a process (e.g., flow chart, tree, or some other defined steps) to optimize the decision making. In the act state, the computer system 20 can act on the decision. Action on the decision can include responding to an entity that requested the analysis (e.g., the request receiving component shown in FIG. 1C), forwarding a result to another entity (e.g., the request processing component shown in FIG. 1C), and/or the like. Such actions can include transmission of data over a primary communications environment and/or transmission of data over an OOB communications environment. As indicated, the OODA cycle continues without end and enables the computer system 20 to identify and adjust to changing conditions. As a result, the computer system 20 can act as a complex adaptive system.

By reducing the time for completing a loop of the OODA decision cycle, the computer system 20 can become more successful at identifying and responding to attacks. The time to complete one loop of the OODA decision cycle, L(t), can be calculated as the sum of the times for each of the four states:

$$L(t)=Obs(t)+Ori(t)+Dec(t)+Act(t).$$

This calculation is analogous to the exposure time E(t), which is calculated as D(t)+R(t). To this extent, L(t)=Obs(t)+Ori(t)+Dec(t)+Act(t)=D(t)+R(t). As a result, as with the exposure time E(t), a goal of L(t) is to reduce the time towards zero.

It is understood that the OODA decision cycle is only illustrative and numerous variations are possible. For example, within each state of the OODA decision cycle, one or more OODA decision cycles can be implemented.

Furthermore, an embodiment of the computer system 20 can use multiple detection solutions, each implementing its own OODA decision cycle, to implement a single overall OODA decision cycle for performing the information security. In this case, the computer system 20 can implement two or more detection solutions, which are integrated as described herein. Additionally, one or more detection solutions can be implemented apart from the computer system 20, e.g., by a user 12. Further details of how implementation of such a combination of detection solutions can provide a more secure information security environment 10 are described herein.

Figure 8:
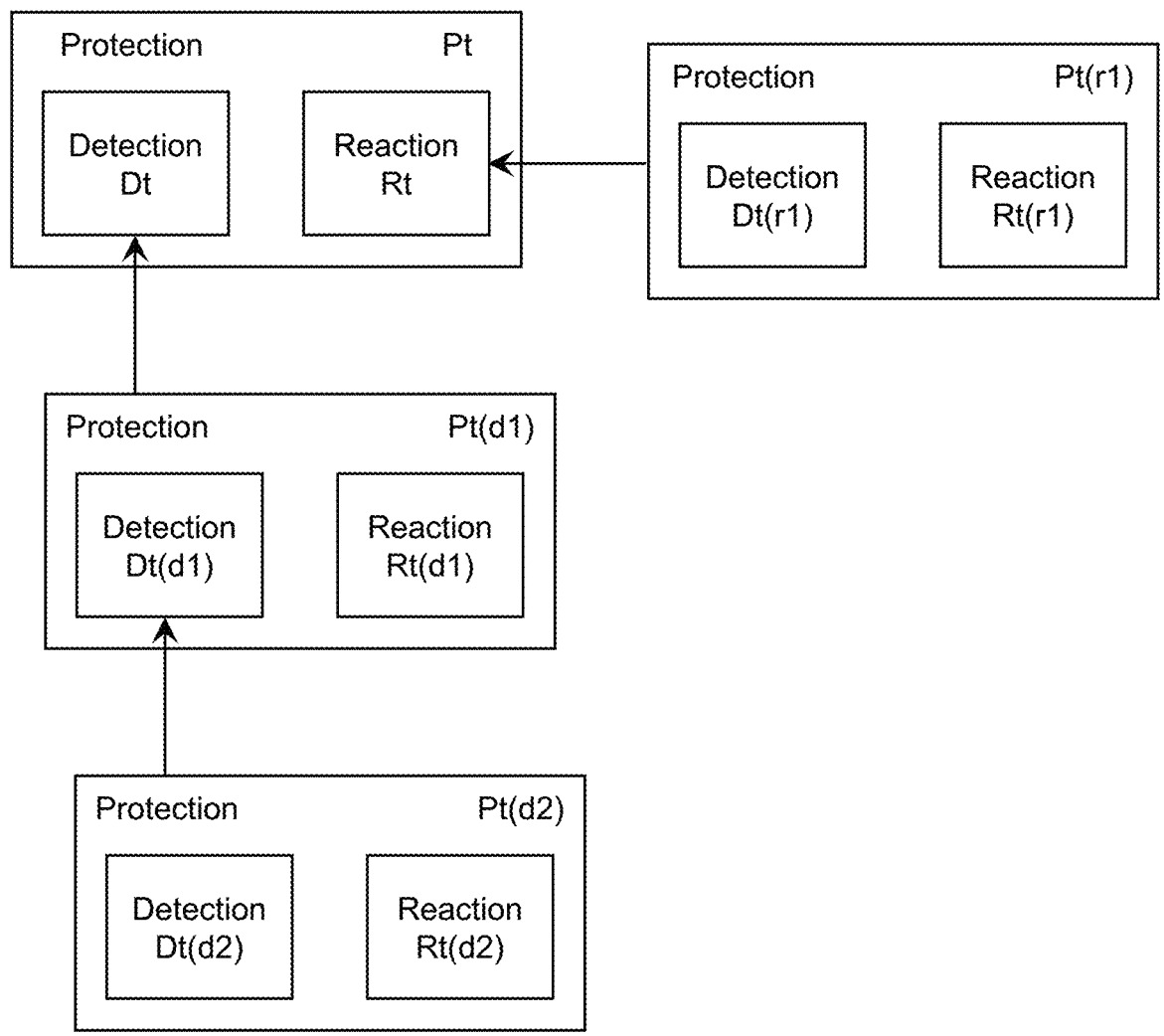
FIG. 8 illustrates a system in which multiple protection components provide defense in depth according to an embodiment.

For example, FIG. 8 illustrates a system in which multiple protection components provide defense in depth according to an embodiment. In this case, a primary protection component Pt, includes a detection component Dt and a reaction component Rt, which can collectively implement an OODA decision cycle described herein. However, the detection component Dt of the primary protection component Pt may have one or more vulnerabilities. To address this, a detection protection component Pt(d1) can be implemented. Similarly, the reaction component Rt can have one or more vulnerabilities, which can be addressed by a reaction protection component Pt(r1). Such protection can extend any number of layers. For example, the system is shown including a secondary detection protection component Pt(d2), which can address vulnerabilities of the detection protection component Pt(d1).

By protecting weaker components of a protection component using one or more additional protection components, the protective security of the primary protection component Pt is maintained. In each case, the combined detection and reaction times of the corresponding system must be less than the time within which protection is required. Furthermore, each protection component can operate independently of the other protection component. To this extent, the protection components can be implemented as isolated systems, without any direct relationship.

As discussed herein, each of the protection component can implement an OODA decision cycle. To this extent, when defense/detection in depth is implemented, various solutions can be utilized to trigger the next defense/detection system. Such a trigger can have an adverse impact on the time that the corresponding state requires to complete. For example, during a point in time of the primary protection component's OODA loop, the detection protection component Pt(d1) and/or the reaction protection component Pt(r1) can be triggered. In an embodiment, the detection protection component Pt(d1) can be triggered prior to the observe state of the OODA loop, e.g., to ensure that the data has not been corrupted. In this case, the detection protection component Pt(d1) can perform its processing OOB, without interfering with the observe state of the OODA loop for the primary protection component Pt.

For the orient state, a sub-loop of detection may not be required. In particular, the algorithm implemented within the orient state will generally not be modifiable by any data that comes from the observe state. Rather, any modifications would be by an external process, which can include its own detection process(es) for validation and/or enhanced administrative trust. In the decide and act states, one or more time-based flip-flops could be added to either or both states, which can increase a trust factor for any decision made/action taken, but will add time to the corresponding decision/action process.

To this extent, when considering adding an additional layer of detection, an amount of time that such a layer will add to the overall process can be a consideration in determining whether the additional protection is sufficiently important to implement. To accommodate the additional time, a solution to provide additional time for the evaluation can be implemented, e.g., by a delay line, degradation of communications, and/or the like.

Figure 9:
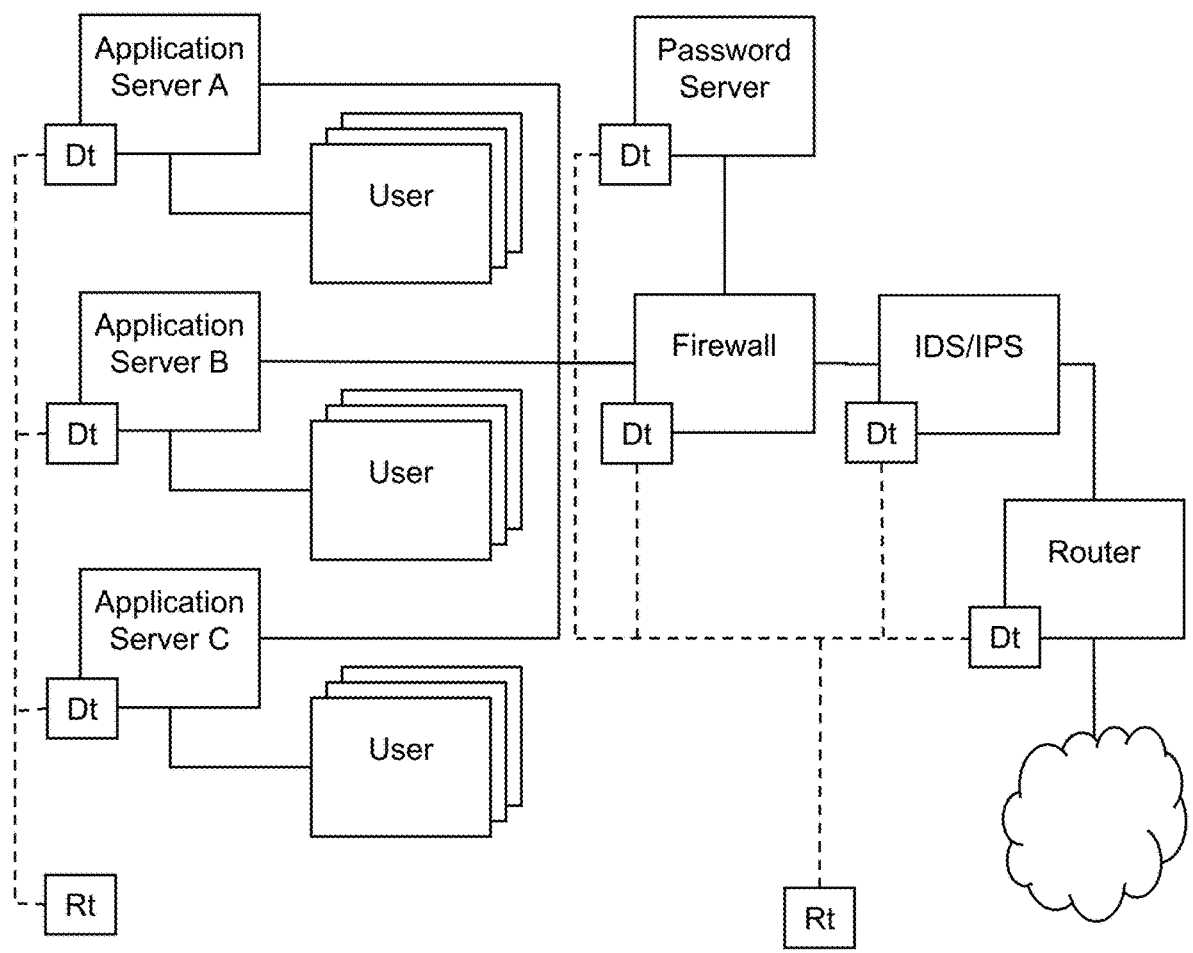
FIG. 9 shows an illustrative network according to an embodiment.

While each protection component is shown including a detection and a reaction component, it is understood that a protection component can include any number of one or more detection components and any number of one or more reaction components. To this extent, FIG. 9 shows an illustrative network according to an embodiment. In this network, various important nodes each include a detection component Dt. For example, various application servers A-C, a password server, a firewall, an intrusion detection system (IDS)/intrusion prevention system (IPS), and a router, are each shown including a detection component Dt. As illustrated, a response component Rt can use data acquired by multiple detection components Dt. For example, in this illustration, a response component Rt can receive and evaluate data from multiple application servers A-C to determine whether any actions are required. Similarly, a response component Rt can receive and evaluate data from the various perimeter systems for the network to determine any necessary actions.

Attack Responses

In an embodiment, in response to an attack or a suspected attack, the computer system 20 (FIG. 4) can implement one of a plurality of responses. For example, in response to a severe attack, the computer system 20 can halt any transmission of traffic there through, effectively disconnecting the downside network from the attack. In an embodiment, as this response is the most extreme response, authorization for this response is required, e.g., from a user 12. Alternatively, such a response can be automatically performed in response to a certainty exceeding a predetermined level for a sufficiently severe attack.

In response to an attack (or a suspected attack), the computer system 20 can initiate one of a plurality of graceful degradation responses to reduce risk due to the attack. For example, the computer system 20 can compress (reduce) a bandwidth used in the transmissions, thereby slowing the ability of the attack to harm the protected system. Similarly, the computer system 20 can pad the data transmitted during the attack, e.g., by adding a percentage of additional data, to the requested data. In this case, the added data makes the responses to requested data larger, thereby taking more time for an attacker to access and/or download the desired data. The computer system 20 can use any of a plurality of possible degradations (e.g., reduced bandwidths, increased percentages, and/or the like), e.g., on a sliding scale, depending on the perceived threat of the attack and/or a certainty of the attack.

In an embodiment, a reaction to a potential attack can comprise increasing a sensitivity of one or more detection components in a system. For example, in the network shown in FIG. 9, in response to a perimeter detection component, such as the firewall detection component, detecting a possible attack, the application server detection components Dt can be automatically adjusted to have an increased sensitivity to such an attack. To this extent, the perimeter reaction component Rt can send a signal that results in the sensitivity of the application server detection components Dt being increased and/or one or more of the perimeter detection components Dt being increased.

Illustrative Applications

Electronic Mail

Using a simple message transfer protocol (SMTP)-based e-mail solution as an illustrative example, upon requesting that an email message be sent, a solution described herein can delay sending the message to provide sufficient time to determine whether the message raises any concerns. For example, a message can raise concerns when it includes one or more of: too much text, inappropriate language, an attachment, sensitive information (e.g., personally identifiable information (PII), sensitive personal information (SPI), etc.), and/or the like. For a message that does not raise any concerns, the message can be sent after the delay period.

Figure 10:
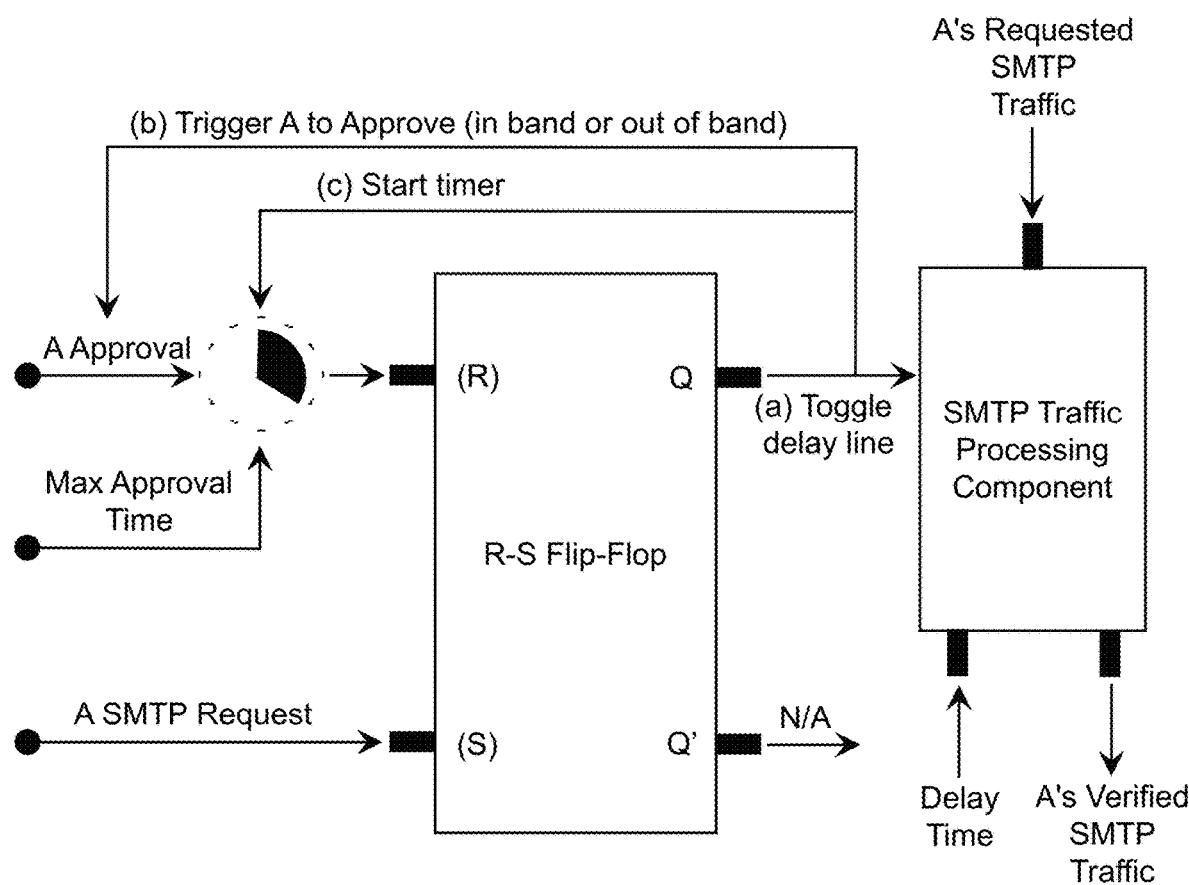
FIG. 10 illustrates use of a time-based flip-flop to require a sender to approve a message according to an embodiment.

For a message that does raise concern, feedback can be used to approve sending the email. For example, FIG. 10 illustrates use of a time-based flip-flop to require a sender to approve a message according to an embodiment. In this case, the e-mail system can request the sender to confirm sending the email using any solution (e.g., in-band by sending an email message requesting confirmation or out-of-band by contacting the sender using a different communication mechanism). The e-mail system can set an amount of time within which the sender must confirm that the message is acceptable to send or the message will not be sent, e.g., a max approval time.

In an embodiment, instead of the sender confirming, a third party can be requested to approve the message for sending using any solution and given a corresponding amount of time within which to respond. In either case, the e-mail system also can set a minimum amount of time prior to receiving confirmation that a message is acceptable to send, e.g., a delay time, to help ensure that the sender/third party actually considered the request. In an embodiment, the maximum approval time is less than the delay time. In this case, verification or non-verification of the message is completed prior to sending the message, if approved. In the event that the message is not verified within the amount of time, the e-mail system can send the message or not send the message, depending on a default setting. When the message is not sent, the requester A should be notified.

Figure 11:
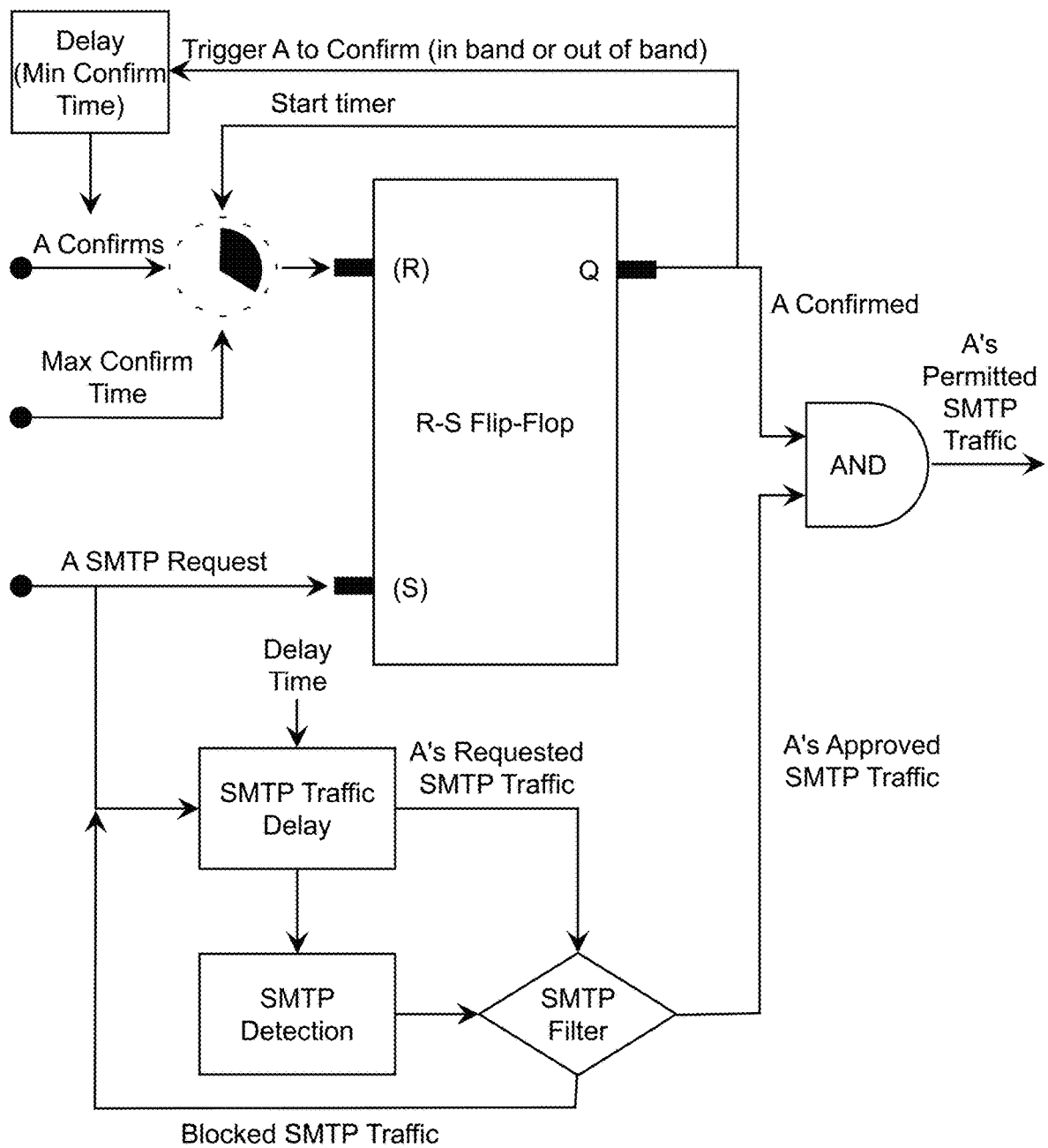
FIG. 11 shows an illustrative system for obtaining multiple confirmations prior to sending a message according to an embodiment.

It is understood that embodiments can require multiple confirmations prior to performing an action, such as sending a suspect email message. To this extent, FIG. 11 shows an illustrative system for obtaining multiple confirmations prior to sending a message according to an embodiment. Similar to FIG. 10, a time-based flip-flop is used to require that the requester A, confirm that the e-mail message is acceptable to send. As illustrated, the confirmation circuit for A includes a delay, which creates a minimum amount of time within which the requester A can confirm the message, as well as a timer that defines the maximum amount of time for the requester A to confirm the message. The minimum time can be useful, e.g., when the requester A is a human to provide some time for reconsideration by the individual. In an embodiment, absent confirmation from the requester A within the min/max time frame, the message can be blocked from sending.

The request is also sent to a second entity for evaluation and, if acceptable, approval. The second entity can be another individual or an automated system, such as an attack protection component 6 (FIG. 1C). Regardless, the message is received by a traffic delay component, which can delay forwarding the message for a specified delay time. The delay time can be selected to be greater than an amount of time required for a detection component (SMTP detection) to evaluate the message and provide a determination as to whether the message is approved or should be blocked. In the SMTP filter, the result of the SMTP detection is used to determine whether A's requested SMTP traffic is approved or blocked. If approved, the SMTP traffic is forwarded to an AND gate, which will send the SMTP traffic only if both the second entity approved of the traffic and the requester A confirmed the request within the allotted times. In the event the request is not approved by the second entity, the requester A can be informed as to why the request was blocked.

It is understood that the circuits of FIGS. 10 and 11 are only illustrative and various alternative configurations are possible. For example, default actions can be to fulfill a request rather than reject a request, absent an explicit disproval by the requester and/or another entity. Furthermore, instead of requiring both confirmation by a requester and approval by another entity as in FIG. 11, an embodiment can permit the requested message to be sent when at least one of these occurs. To this extent, the AND gate shown in the circuit can be replaced with an OR gate.

Data Access/Data Posting

Figure 12:
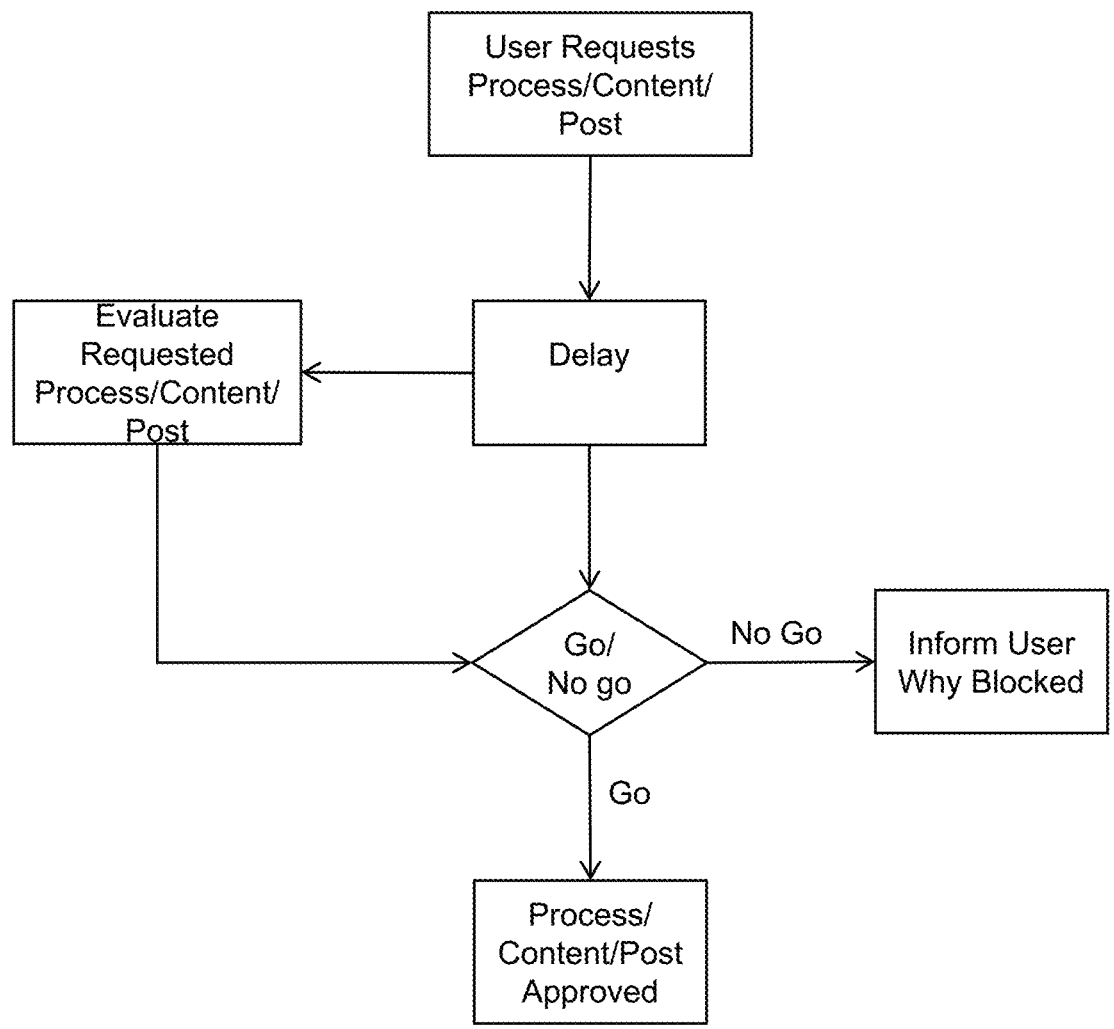
FIG. 12 illustrates a process for reducing occurrences of potentially harmful user requests according to an embodiment.

Users falling for phishing scams and/or posting damaging information (e.g., to a social media platform), such as propagating false stories, can create problems for an organization, including the social media platform on which the posting is made. FIG. 12 illustrates a process for reducing occurrences of potentially harmful user requests according to an embodiment. In this case, in response to receiving a request, e.g., to perform a process, obtain content (e.g., via a link), post content, and/or the like, the fulfillment of the request is delayed for a particular time period and the request is forwarded for evaluation by another entity (e.g., a third party vendor). The evaluation can include analysis of a link corresponding to the request, analysis of data corresponding to the request, and/or the like. In an embodiment, the entity evaluating the request is an automated system (e.g., an attack protection component 6 shown in FIG. 1C), such that a result of the evaluation can be provided in a sufficiently short period of time that a human user does not notice the delay. For example, the delay can be less than one second. Upon receiving the evaluation result or the delay expiring, a decision as to whether the request will be allowed (Go) or not allowed (No go) can be made. If the request is allowed, then the requested process can be performed, content can be retrieved or posted, and/or the like. If the request is not allowed, the user can be informed as to why the request was not allowed.

It is understood that feedback can be used to improve the evaluation process. For example, when a user's request is blocked, the user may provide an explanation or further information as to why the request should not have been blocked. In this case, when such feedback is merited, the evaluating entity can be informed of the error and can adjust the algorithms utilized accordingly. Similarly, when an approved request is found to be damaging, the evaluating entity can adjust the algorithms accordingly. Regardless, the feedback can be used to continually increase the trust factor for the evaluation, which can be propagated to other instances of the evaluation, thereby increasing the trust factor across systems.

Firewall/Denial of Service Attacks

As discussed above, an embodiment of the computer system 20 can comprise a firewall for a communications network. In this case, the computer system 20 can receive network traffic from an external network, which is addressed to one or more computing devices on the communications network. The computer system 20 can evaluate the traffic to determine whether the traffic is allowed or is hostile, and respond accordingly.

In an embodiment, the firewall can comprise a defense in depth solution, e.g., for responding to a denial of service attack. In a denial of service attack, control signal communications can be blocked because of the nature of the attack on a TCP/IP service. Therefore, a remediative reaction along the primary communications media may not be possible. To this extent, the firewall can comprise a second reaction mechanism. During a denial of service attack, the detection path can determine that the primary communications channel is blocked and create a rerouting methodology.

Figure 13:
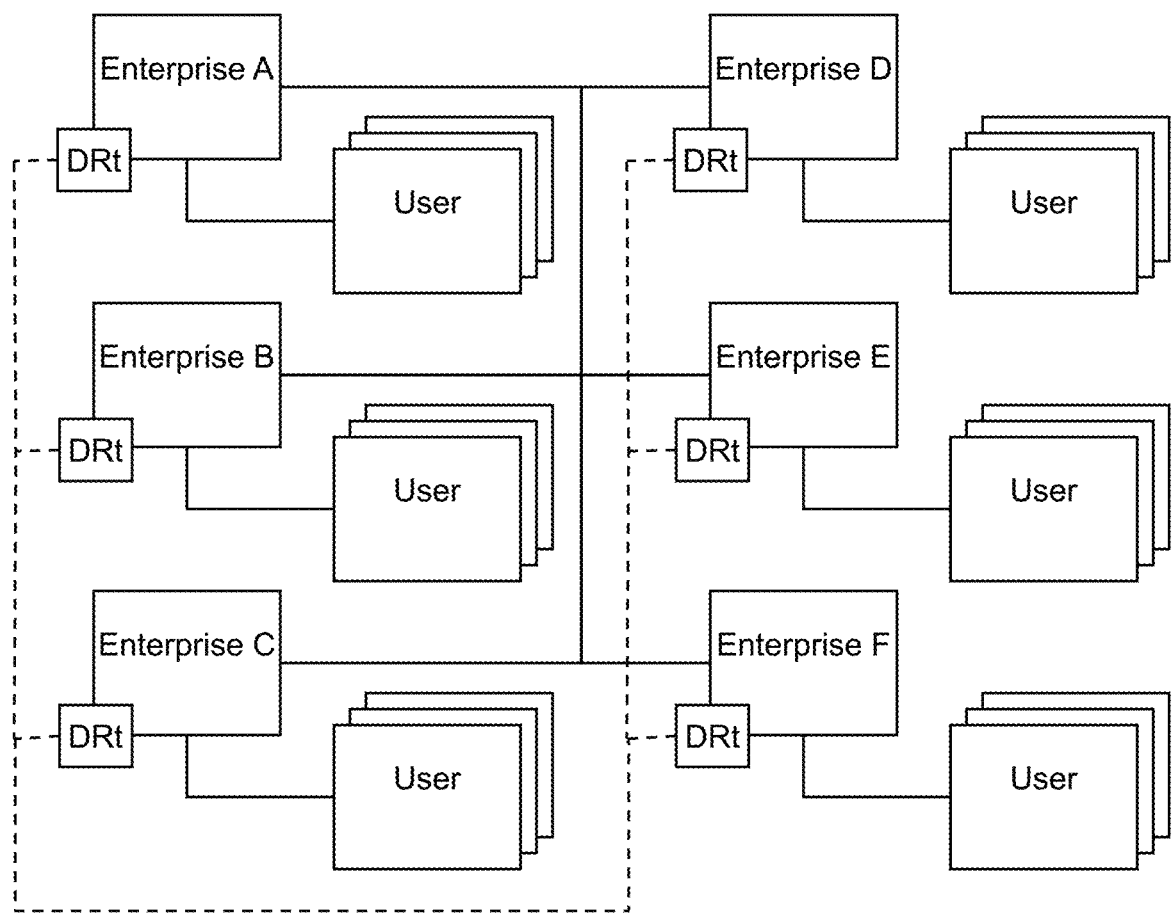
FIG. 13 shows an illustrative network environment for responding to a denial of service attack according to an embodiment.

FIG. 13 shows an illustrative network environment for responding to a denial of service attack according to an embodiment. As illustrated, the network environment includes six enterprise servers A-F (or firewalls for the corresponding servers), each of which can include various users. The enterprise servers can comprise peers on a network, which can communicate with one another using a publicly available communications path (e.g., the solid connectors). The public communications path can be implemented using any network topology (e.g., a ring network, fully connected network, and/or the like). As illustrated, each enterprise server A-F (or corresponding firewall) can include a corresponding detection-reaction component (DRt), which is configured to detect and react to, for example, a denial of service attack.

When a public communications path for the enterprise servers A-F is flooded due to a denial of service attack, the detection-reaction component DRt for the corresponding enterprise server A-F being attacked can use an out of band communications path (e.g., the dashed connectors) to communicate with the detection-reaction components DRt of the other enterprise servers A-F in order to halt the attack. The out of band communications path can be implemented using a completely separate and distinct physical communications infrastructure. In this case, the communications over the out of band communications path will not be affected by a disruption in the public communications path By utilizing servers located at the enterprise level, an out of band communications path is not required for all of the user systems in order to provide effective denial of service protection across the network environment.

The hierarchical infrastructure shown in FIG. 13 can be extended any number of levels. For example, the user systems under an enterprise server can comprise server peers on a network environment, each of which includes multiple users. To this extent, the users under an enterprise server also can include detection-reaction components capable of communicating using an out of band communications path. In this manner, source(s) of a denial of service attack can be isolated from the remaining network environment in an efficient manner.

Measuring Security

Embodiments of a system described herein can be used to measure an effectiveness of a security component. For example, a timer can be used to determine an amount of time that a security component (e.g., an attack protection component 6 shown in FIG. 1C) requires to identify an attack after injecting test traffic that imitates an attack into traffic being monitored by the security component. By applying various different test traffic, both a trust factor and a detection-reaction time for the security component can be determined. Such information can be used to subsequently define delay times and/or other timing, evaluate trust, identify weak points, and/or the like, in a system which includes the security component. In another embodiment, the provider of the security component can provide a confidence, which can be initially used as the trust factor for the security component. The trust factor can be automatically degraded and/or adjusted based on performance of the security component in an implementation and/or after testing.

Such an approach can be used to compare two or more security components. For example, both security components can be provided traffic, which includes the test traffic imitating an attack. The respective security components can be evaluated for an amount of time required to detect the attack (e.g., for delay times required for the security component), a success rate in detecting the attack (e.g., for the trust factor for the security component), and/or the like. Such information can be used to configure a system including the two or more security components. For example, based on the trust factors, it can be determined whether a reaction should be initiated in response to either security component detecting an attack (e.g., an OR gate) or in response to both security components detecting an attack (e.g., an AND gate). Additionally, such information (e.g., the respective trust factors) can be used to rate an effectiveness of each of the first and second security components, e.g., for use as part of a purchasing decision.

Alternative Embodiments

While shown and described herein as a method and system for implementing and/or evaluating information security, it is understood that aspects of the invention further provide various alternative embodiments. For example, in one embodiment, the invention provides a computer program fixed in at least one computer-readable medium, which when executed, enables a computer system to implement and/or evaluate information security using a solution described herein. To this extent, the computer-readable medium includes program code, such as the security program 30 (FIG. 4), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code, such as the security program 30 (FIG. 4), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for implementing and/or evaluating information security. In this case, the generating can include configuring a computer system, such as the computer system 20 (FIG. 4), to implement a method of implementing and/or evaluating information security described herein. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

As used herein, unless otherwise noted, the term "set" means one or more (i.e., at least one) and the phrase "any solution" means any now known or later developed solution.

The singular forms "a," "an," and "the" include the plural forms as well, unless the context clearly indicates otherwise. Additionally, the terms "comprises," "includes," "has," and related forms of each, when used in this specification, specify the presence of stated features, but do not preclude the presence or addition of one or more other features and/or groups thereof.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of implementing information security, the method comprising:
   in response to receiving an interaction request for a requesting entity in traffic communicated over a computer network, a request receiving component starting a timer for an approval time period;
   in response to receiving the interaction request and without prior evaluation of either of the interaction request or the requesting entity, the request receiving component sending a request for approval or disproval of the interaction request by an approving entity for the interaction request;
   prior to the approval time period expiring and without prior evaluation of either of the interaction request or the requesting entity and prior to an approval or disproval of the interaction request by the approving entity, the request receiving component approving and forwarding the interaction request for processing by a request processing component; and
   in response to the approval time period expiring prior to the approval or disproval of the interaction request by the approving entity, the request receiving component revoking the approval for the interaction request.

2. The method of claim 1, further comprising, in response to receiving the interaction request, the request processing component delaying processing the interaction request for a delay line period.

3. The method of claim 2, wherein the delay line period is greater than the approval time period.

4. The method of claim 1, further comprising the request processing component initiating processing the interaction request prior to expiration of the approval time period and prior to receiving an approval or disproval of the interaction request.

5. The method of claim 4, further comprising the request processing component halting further processing of the interaction request in response to at least one of: the interaction request being disproved or the approval time period expiring without receiving an approval or disproval.

6. The method of claim 1, wherein the interaction request is a request to send an email message, and wherein the approving entity for the interaction request includes at least one of: a user requesting to send the email message or a user having a higher trust factor than a trust factor for the user requesting to send the email message.

7. The method of claim 6, wherein, in response to expiration of the approval time period, the request processing component either sends the email message or does not send the email message and informs the user requesting to send the email message.

8. The method of claim 6, wherein the interaction request is further provided for approval or disproval by an automated attack protection component within an automated approval time period after a delay time corresponding to the approval time period, and wherein the request processing component only sends the email message when both the approving entity and the automated attack protection component approve of the interaction request within the corresponding approval time periods.

9. The method of claim 1, wherein the request for approval or disproval is automatically processed by an attack protection component, wherein the attack protection component evaluates the interaction request using a trust factor for the requesting entity.

10. The method of claim 9, wherein the attack protection component automatically degrades the trust factor for the requesting entity over time such that the requesting entity has a lower trust over time.

11. The method of claim 10, wherein the attack protection component adjusts the trust factor in response to evaluating additional information regarding the requesting entity.

12. A computer system comprising:
   a computing device including a request receiving component for receiving interaction requests in traffic communicated over a computer network and a request processing component for processing the interaction requests, wherein the request receiving component is configured to:
      in response to receiving an interaction request for a requesting entity over the computer network, start a timer for an approval time period;
      in response to receiving the interaction request and without prior evaluation of either of the interaction request or the requesting entity, send a request for approval or disproval of the interaction request by an approving entity for the interaction request; and
      prior to the approval time period expiring and without prior evaluation of either of the interaction request or the requesting entity and prior to an approval or disproval of the interaction request by the approving entity, approve and forward the interaction request for processing by the request processing component; and
      in response to the approval time period expiring prior to the approval or disproval of the interaction request by the approving entity, the request receiving component revoking the approval for the interaction request.

13. The system of claim 12, wherein, in response to receiving the interaction request, the request processing component delays processing the interaction request for a delay line period.

14. The system of claim 12, wherein the request processing component initiates processing the interaction request prior to expiration of the approval time period and prior to receiving an approval or disproval of the interaction request.

15. The system of claim 14, wherein the request processing component halts further processing of the interaction request in response to at least one of: the interaction request being disproved by the approving entity or the request receiving component revoking the approval for the interaction request.

16. The system of claim 12, wherein the interaction request is a request to send an email message, and wherein the approving entity for the interaction request includes at least one of: a user requesting to send the email message or a user having a higher trust factor than a trust factor for the user requesting to send the email message.

17. The system of claim 12, further comprising an attack protection component configured to automatically process the request for approval or disproval, wherein the attack protection component evaluates the interaction request using a trust factor for the requesting entity.

18. The system of claim 17, wherein the attack protection component automatically degrades the trust factor for the requesting entity over time such that the requesting entity has a lower trust over time.

19. A computer system comprising:
a computing device including:
   a request receiving component for receiving interaction requests in traffic communicated over a computer network;
   a request processing component for processing the interaction requests; and
   an attack protection component for evaluating the interaction requests with respect to at least one type of attack,
wherein, in response to receiving an interaction request for a requesting entity:
   the request receiving component starts a timer for an approval time period;
   the request receiving component, without prior evaluation of either of the interaction request or the requesting entity, sends a request for approval or disproval of the interaction request for processing by the attack protection component;
   the request receiving component, without prior evaluation of either of the interaction request or the requesting entity, approves and forwards the interaction request for processing by the request processing component prior to the approval time period expiring and prior to an approval or disproval of the interaction request;
   the attack protection component evaluates the interaction request for approval or disproval; and
   the request receiving component revokes approval of the interaction request in response to the approval time period expiring prior to the approval or disproval of the interaction request by the attack protection component; and
   the request processing component halts further processing the interaction request in response to the request receiving component revoking approval of the interaction request or the attack protection component disproving the interaction request or continues processing the interaction request in response to the attack protection component approving the interaction request.

20. The computer system of claim 19, wherein the computing device is a firewall.

* * * * *